(12) United States Patent
Niwa

(10) Patent No.: US 7,174,309 B2
(45) Date of Patent: Feb. 6, 2007

(54) DATA DISTRIBUTION SYSTEM

(75) Inventor: Yushi Niwa, Tokyo (JP)

(73) Assignee: NEC Corporation, Tokyo (JP)

( * ) Notice: Subject to any disclaimer, the term of this patent is extended or adjusted under 35 U.S.C. 154(b) by 715 days.

(21) Appl. No.: 09/978,539

(22) Filed: Oct. 18, 2001

(65) Prior Publication Data

US 2002/0046180 A1    Apr. 18, 2002

(30) Foreign Application Priority Data

Oct. 18, 2000    (JP)    ............................. 2000-318149

(51) Int. Cl.
*G06G 30/00*    (2006.01)
*G06F 17/30*    (2006.01)

(52) U.S. Cl. ........................ 705/26; 705/27; 709/201; 707/10; 707/104.1

(58) Field of Classification Search ................ 709/219; 705/51, 1, 26; 725/87, 62
See application file for complete search history.

(56) References Cited

U.S. PATENT DOCUMENTS

| | | |
|---|---|---|
| 5,874,986 A | 2/1999 | Gibbon et al. |
| 5,907,617 A * | 5/1999 | Ronning ...................... 705/52 |
| 5,926,624 A | 7/1999 | Katz et al. |
| 5,956,716 A | 9/1999 | Kenner et al. |
| 6,157,948 A | 12/2000 | Inoue et al. |

(Continued)

FOREIGN PATENT DOCUMENTS

GB    2 354 095 A    3/2001

(Continued)

OTHER PUBLICATIONS

Wong, William "GETTING in SYNCH." Apr. 1998, Network VAR, v6, n4, p. 34(6). Dialog No. 02162361 (File 275).*

*Primary Examiner*—Lynda Jasmin
(74) *Attorney, Agent, or Firm*—Foley & Lardner LLP

(57) ABSTRACT

A game database storing a game program as pay data, a distribution server, and an account server are provided within a service provider side device. The account server sends, through a radio network, a part of a game program to a storage unit in a service user side device, before the arrival of the fixed time of the start of use. When the user has decided to purchase the game program on or after the day on which the data becomes usable, the program part is sent to a game terminal so that the play of the game can be started. Upon the receipt of a request from the user for the distribution of the remaining part of the program, the user's balance is checked for the purchase of the remaining part of the program and, thereafter, the remaining part of the program is sent from the distribution server to the radio terminal so that the user can enjoy the subsequent part of the game without delay. The above construction can shorten the time period between the request for the distribution of data and the reproduction of the distributed data in predetermined communication environment such as radio data communication environment, and can reduce the concentration of load on the distribution server. Further, the invention can also be applied to distribution data for which the limitation of the time of the start of use is not provided.

18 Claims, 15 Drawing Sheets

U.S. PATENT DOCUMENTS

| | | |
|---|---|---|
| 6,166,735 A | 12/2000 | Dom et al. |
| 6,226,618 B1* | 5/2001 | Downs et al. ............ 705/1 |
| 6,269,394 B1 | 7/2001 | Kenner et al. |
| 6,377,996 B1 | 4/2002 | Lumelsky et al. |
| 6,418,473 B1 | 7/2002 | St. Maurice et al. |
| 6,470,085 B1* | 10/2002 | Uranaka et al. ............ 380/231 |
| 6,510,502 B1 | 1/2003 | Shimizu |
| 6,609,144 B1 | 8/2003 | Inoue |
| 6,668,375 B1 | 12/2003 | Leovac |
| 6,721,794 B2 | 4/2004 | Taylor et al. |
| 6,941,353 B1* | 9/2005 | Lane ............ 709/219 |
| 2002/0010740 A1* | 1/2002 | Kikuchi et al. ............ 709/203 |
| 2002/0049679 A1 | 4/2002 | Russell et al. |
| 2002/0065816 A1* | 5/2002 | Tsusaka et al. ............ 707/3 |
| 2002/0107803 A1* | 8/2002 | Lisanke et al. ............ 705/51 |
| 2002/0129349 A1* | 9/2002 | Ebisawa ............ 717/172 |
| 2002/0152876 A1 | 10/2002 | Hughes et al. |
| 2002/0174010 A1* | 11/2002 | Rice, III ............ 705/14 |
| 2002/0174366 A1* | 11/2002 | Peterka et al. ............ 713/201 |
| 2003/0037124 A1 | 2/2003 | Yamaura et al. |
| 2003/0093639 A1 | 5/2003 | Shimizu |
| 2003/0122954 A1* | 7/2003 | Kassatly ............ 348/335 |
| 2003/0133702 A1* | 7/2003 | Collart ............ 386/125 |
| 2003/0149988 A1* | 8/2003 | Ellis et al. ............ 725/87 |
| 2004/0022104 A1 | 2/2004 | Inoue et al. |

FOREIGN PATENT DOCUMENTS

| | | |
|---|---|---|
| JP | 8-173634 | 7/1996 |
| JP | 8-202638 | 8/1996 |
| JP | 8-205119 | 8/1996 |
| JP | 10-269078 | 10/1998 |
| JP | 10-302150 | 11/1998 |
| JP | 11-154184 | 6/1999 |
| JP | 11-250145 | 9/1999 |
| JP | 2000-35885 | 2/2000 |
| JP | 2000-99010 | 4/2000 |
| JP | 2000-184087 | 6/2000 |
| JP | 2000-196585 | 7/2000 |
| JP | 2000-339852 | 12/2000 |
| WO | WO98/11723 | 3/1998 |

* cited by examiner

FIG.5

| ITEMS | CONTENTS |
|---|---|
| NAME OF DATA | CONSPIRACY OF BORGIA |
| TYPE OF DATA | GAME PROGRAM |
| DATE OF START OF USE | 0, 0, 0 A.M, ON JUNE 20, 2000 |
| DATE OF END OF USE | 11, 59, 59 P.M, DECEMBER 31, 2020 |
| 1st DATA CHARGE | 4890 YEN |
| 2nd DATA CHARGE | 525 YEN |
| TOTAL DATA QUANTITY | 2048000 BYTES |

132A REGION WHERE ITEMS ARE DESCRIBED
132B REGION WHERE CONTENTS ARE DESCRIBED
132 ATTRIBUTE INFORMATION REGION

DATA DISTRIBUTION SYSTEM

FIELD OF THE INVENTION

The invention relates to a data distribution system for distributing various data including image data, text data, software, or music information, and more particularly to a data distribution system for distributing data through radio terminals such as portable telephones (cellular phones).

BACKGROUND OF THE INVENTION

Radio terminals, such as portable telephones, PHS (personal handyphone system), or small-size personal computers provided with a telephone or data communication function, have become popular. These radio terminals have been extensively used for calls, as well as for electronic mails or communication of various data. Further, this radio data communication environment has also become used to distribute pay data. Distribution of data by a distribution server is disclosed, for example, in Japanese Patent Laid-Open Nos. 184087/2000, 269078/1998, and 096237/1999.

Since acquisitors or users pay a charge for pay data, a premise is that data per se have an economical value. Such data include, for example, certain image data, musical piece data, text data, and program data, for example, for video games. Up to now, users have acquired most of these data in the form of records comprising the data recorded in recording media, such as paper or CDs (compact disks), by mail or through sales in shops. As described above, however, the advance of communication environment has made it sufficiently possible to realize a commercially acceptable system wherein, for example, the radio data communication environment is utilized to acquire these data as pay data. Delivery of the above pay data to users through the utilization of the radio data communication environment involves problems of reliable data distribution and accounting with respect to the equivalent to the data.

A large number of proposals have hitherto been made on data distribution systems for pay data distribution and accounting. These proposals can be roughly classified into two basic types. The first type is such that pay data are encrypted and, upon the payment of an equivalent to the data, a user receives key data. The second type is such that the right of access to pay data is authorized only to users who have previously paid the equivalent.

These proposals, however, are on the assumption that the distribution side of pay data is connected to users through a wired communication line, In wired data communication environment, the lowering of communication expense is being extensively carried out, and, in addition, the environment of leased lines or full-time connection is being prepared. Further, in many cases, data transfer rate per unit time is much higher than that in radio communication.

On the other hand, in the case of radio data communication environment, the data transfer rate is in many cases lower than that in the case of the wired data communication environment, and, in addition, the communication charge is high. For this reason, at the present time, systems for the distribution of pay data, which has been performed through communication equipment using wired transmission lines, such as telephone lines or CATV (cable television), are difficult to be spread in the field of radio data communication. Problems involved in the radio data communication environment will be explained in more detail.

The first problem is that the time period between the start of the user's operation for the acquisition of pay data and the acquisition of the contemplated data followed by reproduction or utilization of the data is long. The conventional first type of data distribution systems, wherein pay data are sent and are deciphered using a key, is on the assumption that a considerable quantity of initially encrypted pay data as one unit is entirely sent to the user side. This is because the data cannot be properly decrypted so far as at least one unit of encrypted data is not present on the user side.

For example, regarding general pay data, in the case of the acquisition of data on one piece of music, the size of one pay data is about 2 M (mega) bytes to about 3 M bytes. When this pay data is acquired through data communication, for example, by means of PHS of 64 K (kilo) bits/sec, the time necessary for this is about 10 min. In this case, in addition to the time necessary for the download, the procedure for the issue of a key and the communication time for the transmission of the key are further necessary.

Also in the second type system wherein the right of access to the pay data is authorized only to users who have previously paid the equivalent, the time period between the start of the operation for the acquisition of pay data and the completion of acquisition of the pay data is the same as that required in the first type system because the communication environment is identical. That is, for both the systems, since the data transfer rate is so low that a considerably lot of transfer time is required for acquiring one data on average, and, thus, when the communication time is the basis of the charge, the communication charge is increased by the extra time. On the other hand, when the data quantity is the basis of the charge, the probability of the occurrence of communication error increases with increasing the communication time. This often poses a problem that the reliability of the receipt of data is lowered.

The second problem involved in the radio data communication environment is that, in relationship with the start time of the distribution of pay data, the distribution processing of the distribution server is likely to be concentrated. Therefore, the distribution server should have a performance high enough to withstand the high load which temporarily occurs. To cope with the temporary high load, an excessive performance and an equipment cost for obtaining this performance are required as compared with the case where, for example, the load on the distribution server has been equally dispersed.

When the distribution server does not have satisfactory performance, it is a matter of course that the time period between the user's request for the distribution of pay data and the completion of the distribution of the pay data is sometimes significantly increased. For example, on the date of sale or at the time of sale of musical piece data or game programs, the request for the transmission of pay data is likely to be intensively made from each terminal of users. For example, in the case of the musical pieces, data of 2 M bytes to 3 M bytes for each request should be continuously sent by the distribution server to the user who has requested the transmission of data. When processing of send data beyond the number of communication lines connected to the distribution server or beyond the bandwidth of the communication path is necessary, however, the processing for each user is delayed and, thus, the data distribution processing per se is delayed.

SUMMARY OF THE INVENTION

Accordingly, it is a first object of the invention to provide a data distribution system which can shorten the period of time between the request for the distribution of data in predetermined communication environment such as radio data communication environment and the reproduction of the data.

It is a second object of the invention to provide a data distribution system which, even when the request for the distribution of data is intensively made in predetermined communication environment such as radio data communication environment, the load on the distribution server can be reduced.

According to the first feature of the invention, a data distribution system comprises: (i) partial data preliminary distribution means for distributing partial data, comprising a part of distribution data, together with attribute data including the price of the distribution data, to a storage region provided in each user side; (ii) partial data reproduction release means which, when the user side has decided to purchase the partial data distributed by the partial data preliminary distribution means or the remaining undistributed part of the distribution data, renders the partial data except for the attribute data reproducible from the time of the decision at the earliest; and (iii) remaining distribution data distribution means which, upon the receipt of a request from the user side for the distribution of the undistributed remaining part of the data corresponding to the partial data, distributes the remaining distribution data to the user who has requested the distribution of the remaining data.

According to this construction, partial data comprising a part of the distribution data is temporarily distributed to a storage region provided on each user side, and the reproduction of the data by the purchaser is released. By virtue of this, the distribution of the whole distribution data at a time can be avoided, and, thus, the load on the distribution server can be reduced. Further, for the attribute data contained in the distributed partial data, since the user can see or listen before the decision of the purchase, the partial data can be utilized as a trial version. This can promote the sales of the distribution data and, in addition, can prevent erroneously purchasing uncontemplated contents.

According to the second feature of the invention, a data distribution system comprises: (i) partial data preliminary distribution means for distributing partial data, comprising a part of distribution data, together with attribute data including the price of the distribution data, to a storage region provided in each user side; (ii) partial data reproduction release means which, when the user side has decided to purchase the partial data distributed by the partial data preliminary distribution means or the remaining undistributed part of the distribution data, renders the partial data except for the attribute data reproducible from the time of the decision at the earliest; (iii) payment ability judgment means which, upon the receipt of a request from the user side for the distribution of a part or the whole of the undistributed remaining part of the data corresponding to the partial data, judges whether or not the user, who has requested the distribution of a part or the whole of the undistributed remaining part of the distribution data, can pay the equivalent to the distribution data; (iv) requested data distribution means which, when the result of the judgment by the payment ability judgment means is that the user can pay the equivalent, distributes the requested data to the corresponding user side; (v) accounting means which, when the distribution of the requested data by the requested data distribution means to the user side has been confirmed, performs accounting of the distribution data for the user; and (vi) requested data reproduction release means which renders the remaining part of the data, which has been distributed by the requested data distribution means upon the completion of the accounting by the accounting means, usable on the user side.

According to this constructions as with the construction of the data distribution system according to the first feature of the invention, a partial data comprising a part of the distribution data is temporarily distributed to a storage region provided on each user side, and the reproduction of the data by the purchaser is released. By virtue of this, the distribution of the whole distribution data at a time can be avoided, and, thus, the load on the distribution server can be reduced. Further, for the attribute data contained in the distributed partial data, since the user can see or listen before the decision of the purchase, the partial data can be utilized as a trial version. This can promote the sales of the distribution data and, in addition, can prevent erroneously purchasing uncontemplated contents. Further, as soon as the distribution of a part or the whole of the undistributed remaining part of the data corresponding to the partial data has been requested, the payment ability judgment means judges whether or not the user can pay the equivalent to the distribution data. When the result of the judgment by the payment ability judgment means is that the user can pay the equivalent, the requested data is distributed to the corresponding user side. Therefore, reliable payment of the equivalent to the distributed data can be realized. Further, rather than the transmission of the distribution data to the user side after the equivalent was actually paid, a method is used wherein, after the confirmation of the send to the user, accounting is carried out and the distributed data is then rendered usable on the user side. Therefore, the users's benefit can be ensured. In addition, the data in the remaining part, that is, the part other than the partial data, can be sent in an early stage before the payment, and, since the time of the transmission is not limited, the load on the distribution server can be reduced.

According to the third feature of the invention, a data distribution system comprises: (i) partial data preliminary distribution means for distributing partial data, comprising a part of distribution data for which the time of the start of use has been fixed, together with attribute data, which can be disclosed before the arrival of the time of the start of use, including the time of the start of use and/or the price of the distribution data, before the arrival of the time of the start of use, to a storage region provided in each user side; (ii) partial data reproduction release means which, when the user side has decided to purchase the partial data distributed by the partial data preliminary distribution means or the remaining undistributed part of the distribution data, renders the partial data except for the attribute data reproducible from the fixed time of the start of use at the earliest; and (iii) remaining distribution data distribution means which, after the fixed time of the start of use, upon the receipt of a request from the user side for the distribution of the undistributed remaining part of the data corresponding to the partial data, distributes the remaining distribution data to the user who has requested the distribution of the remaining data.

According to this construction, a partial data comprising a part of the distribution data, for which the time of the start of use has been fixed, is temporarily distributed to a storage region provided on each user side, and, at or after the fixed time of the start of use, the reproduction of the partial data by the purchaser is released. By virtue of this, the distribution of the whole distribution data at a time at the fixed time of the start of use can be avoided. Thus, the load on the distribution server can be reduced, and, in addition, the time necessary for each user to start the reproduction of the data can be shortened. Further, for the attribute data contained in the partial data distributed before the time of the start of use, since the user can see or listen before the arrival of the time of the start of use, the partial data can be utilized as a trial version. This can promote the sales of the distribution data and, in addition, can prevent erroneously purchasing uncontemplated contents.

According to the fourth feature of the invention, a data distribution system comprises: (i) partial data preliminary distribution means for distributing partial data, comprising a part of distribution data for which the time of the start of use has been fixed, together with attribute data, which can be disclosed before the arrival of the time of the start of use, including the time of the start of use and/or the price of the distribution data, before the arrival of the time of the start of use, to a storage region provided in each user side; (ii) partial data reproduction release means which, when the user side has decided to purchase the partial data distributed by the partial data preliminary distribution means or the remaining undistributed part of the distribution data, renders the partial data except for the attribute data reproducible from the time of the start of use at the earliest; (iii) payment ability judgment means which, after the fixed time of the start of use, upon the receipt of a request from the user side for the distribution of a part or the whole of the undistributed remaining part of the data corresponding to the partial data, judges whether or not the user, who has requested the distribution of a part or the whole of the undistributed remaining part of the distribution data, can pay the equivalent to the distribution data; (iv) requested data distribution means which, when the judgment by the payment ability judgment means is that the user can pay the equivalent, distributes the requested data to the corresponding user side; (v) accounting means which, when the distribution of the requested data to the user side by the requested data distribution means has been confirmed, performs accounting of the distribution data for the user; and (vi) requested data reproduction release means which renders the remaining part of the data, which has been distributed by the requested data distribution means upon the completion of the accounting by the accounting means, usable on the user side.

According to this construction, as with the construction of the data distribution system according to the first feature of the invention, a partial data comprising a part of the distribution data, for which the time of use has been fixed, is temporarily distributed to a storage region provided on each user side, and, at or after the fixed time of the start of use, the reproduction of the partial data by the purchaser is released. By virtue of this, the distribution of the whole distribution data at a time at the fixed time of the start of use can be avoided. Thus, the load on the distribution server can be reduced, and, in addition, the time necessary for each user to start the reproduction of the data can be shortened. Further, for the attribute data contained in the partial data distributed before the fixed time of the start of use, since the user can see or listen before the arrival of the time of the start of use, the partial data can be utilized as a trial version. This can promote the sales of the distribution data and, in addition, can prevent erroneously purchasing uncontemplated contents. Further, as soon as the distribution of a part or the whole of the undistributed remaining part of the data corresponding to the partial data has been requested, the payment ability judgment means judges whether or not the user can pay the equivalent to the distribution data. When the result of the judgment by the payment ability judgment means is that the user can pay the equivalent, the requested data is distributed to the corresponding user side. Therefore, reliable payment of the equivalent to the distributed data can be realized. Further, rather than the transmission of the distribution data to the user side after the equivalent was actually paid, a method is used wherein, after the confirmation of the transmission to the user, accounting is carried out and the distributed data is then rendered usable on the user side. Therefore, the user's benefit can be ensured. In addition, the data in the remaining part, that is, the part other than the partial data, can be sent in an early stage before the payment, and, since the time of the send is not limited, the load on the distribution server can be reduced.

In the data distribution systems according to any one of the first to fourth features of the invention, preferably, the remaining distribution data is divided into a plurality of parts and the data distribution system further comprises distribution interval regulation means that regulates the interval of the distribution of the remaining distribution data for each divided unit to the user according to the progress of the reproduction of the distribution data by the user.

According to this construction, the division of the remaining distribution data into a plurality of parts can realize the regulation of the interval of the distribution of the remaining distribution data for each divided unit to the user according to the progress of the reproduction of the distribution data by the user. This can disperse the transmission of the distribution data, and the load on the distribution server can be reduced, Further, the division of the distribution data into a plurality of parts is advantageous in that, when a user wishes to purchase only a part of the distribution data, the contemplated part of the divided data can be distributed to the user at a reduced charge.

In the data distribution systems according to any one of the first to fourth features of the invention, the distribution data may be distributed through a radio network.

When a radio network is used, the data transfer rate is relatively low, sometimes leading to increased communication expense. The realization of the selection of a time zone or the like, where the communication expense is low, rather than the transmission of the whole distribution data at a time, however, can reduce the communication expense. In this connection, it should be noted that, even in the case of a wired network, the invention can be applied to an environment such that the line is thin and, hence, the data transfer rate cannot be increased.

In the second or fourth feature of the invention, the data distribution system may further comprise means, for balance processing during sales processing, that, when the result of the judgment by the payment ability judgment means is that the user can pay the equivalent, issues a sales code indicating, that sales processing is under execution, and subtracts the amount of money to be paid from the user's balance to determine a new balance value.

According to this construction, a problem of the time lag, between the time when the equivalent has been judged to be payable from the user's balance and the time when the payment has been actually made, can be solved by the issue of a sales code, and, even when purchase processing for the distribution data has been repeatedly made in a time zone until the payment is actually made, the payment can be reliably executed.

The data distribution system described just above may further comprise means, for establishing the balance at the time of the completion of accounting, that, when accounting has been performed by the accounting mean, discards the sales code to establish the balance.

According to this construction, upon the completion of the accounting by the accounting means, the sales code per se, which has performed the role, is discarded.

In the data distribution system according to the embodiment of the second or fourth feature of the invention, preferably, the period of validity is provided in the sales code and the data distribution system further comprises means, for establishing the balance at the time of no charging, that, when the period of validity has expired, returns the new balance value, obtained by subtracting the equivalent value from the balance, to the original value based on recognition that the payment corresponding to the issued sales code has not been made.

According to this construction, since the accurate balance cannot be established so far as the sales code is present, the period of validity is provided and, when the procedure, necessary until the execution of the accounting, is prolonged, the new balance value obtained by subtracting the amount of money for the purchase from the balance is returned to the original value.

BRIEF DESCRIPTION OF THE DRAWINGS

The invention will be explained in more detail in conjunction with the appended drawings, wherein:

FIG. 5 is a diagram illustrating one embodiment of attribute information region in the preferred embodiment of the invention;

DESCRIPTION OF THE PREFERRED EMBODIMENTS

Preferred embodiments of the invention will be described in detail in conjunction with the accompanying drawings.

Figure 1:
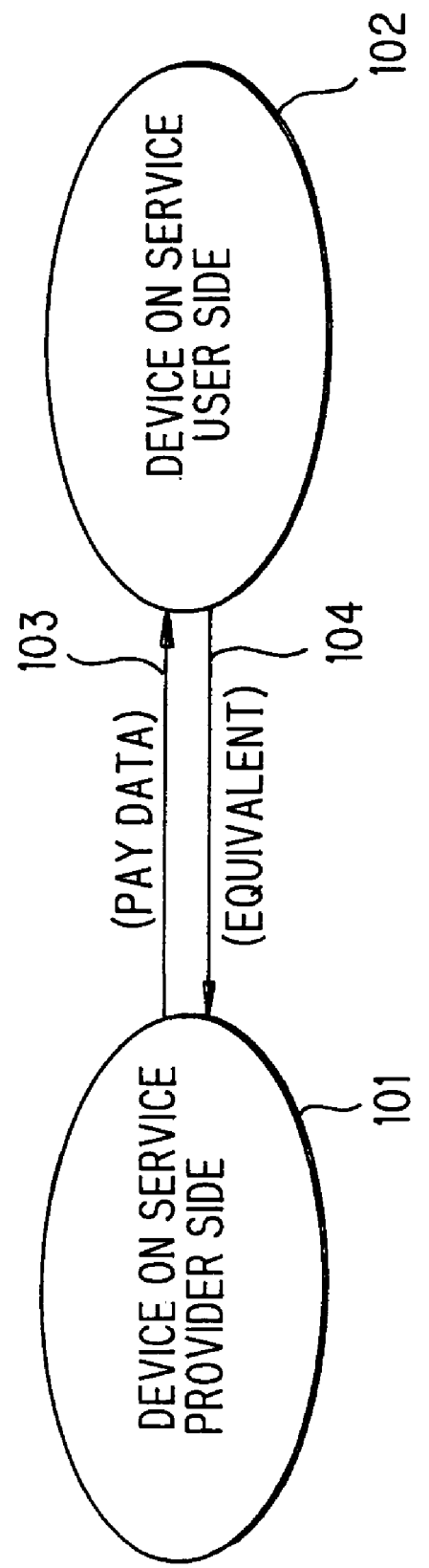
FIG. 1 is a schematic system construction diagram showing the construction of a data distribution system in one preferred embodiment of the invention.

FIG. 1 is a schematic diagram showing a data distribution system in one preferred embodiment of the invention. This data distribution system comprises a service provider side device 101 and a service user side device 102. The service provider side device 101 and the service user side device 102 each are present in necessary number. Here, however, for simplification of the drawing, only one service provider side device 101 and one service user side device 102 are shown in the drawings. The service provider side device 101 provides pay data 103 to the service user side device 102, and the service user side device 102 pays an equivalent 104 to the service provider side device 101.

Figure 2:
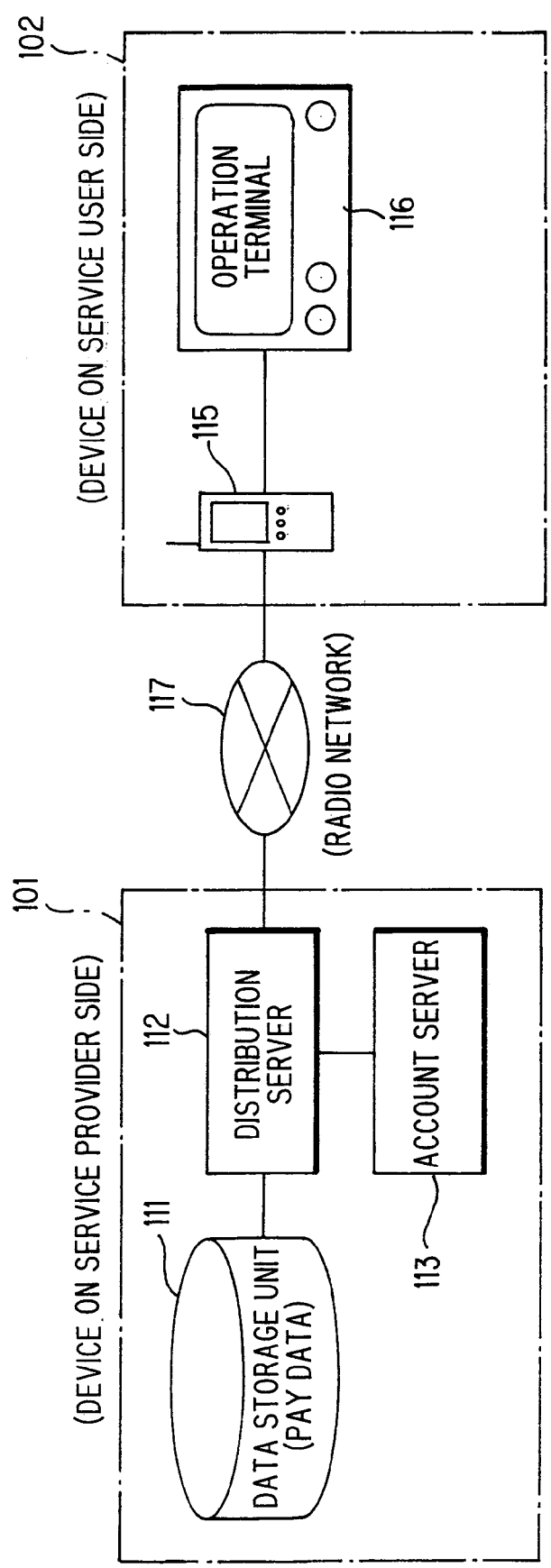
FIG. 2 is a system construction diagram showing a part of general construction of the data distribution system in the preferred embodiment shown in FIG. 1.

FIG. 2 is a schematic diagram showing the construction of the data distribution system in the preferred embodiment shown in FIG. 1. The service provider side device 101 comprises: a data storage unit 111 for storing pay data, such as a magnetic disk; a distribution server 112 connected to the data storage unit 111, for the distribution of pay data; and an account server 113 for accounting at the time of the distribution of the pay data. The service user side device 102 comprises: a radio terminal 115 for receiving and storing a part of pay data (hereinafter referred to as "partial data") distributed from the distribution server 112 through radio communication; and an operation terminal 116 for reproducing the pay data. A radio network 117 is provided between the service provider side device 101 and the service user side device 102.

Figure 3:
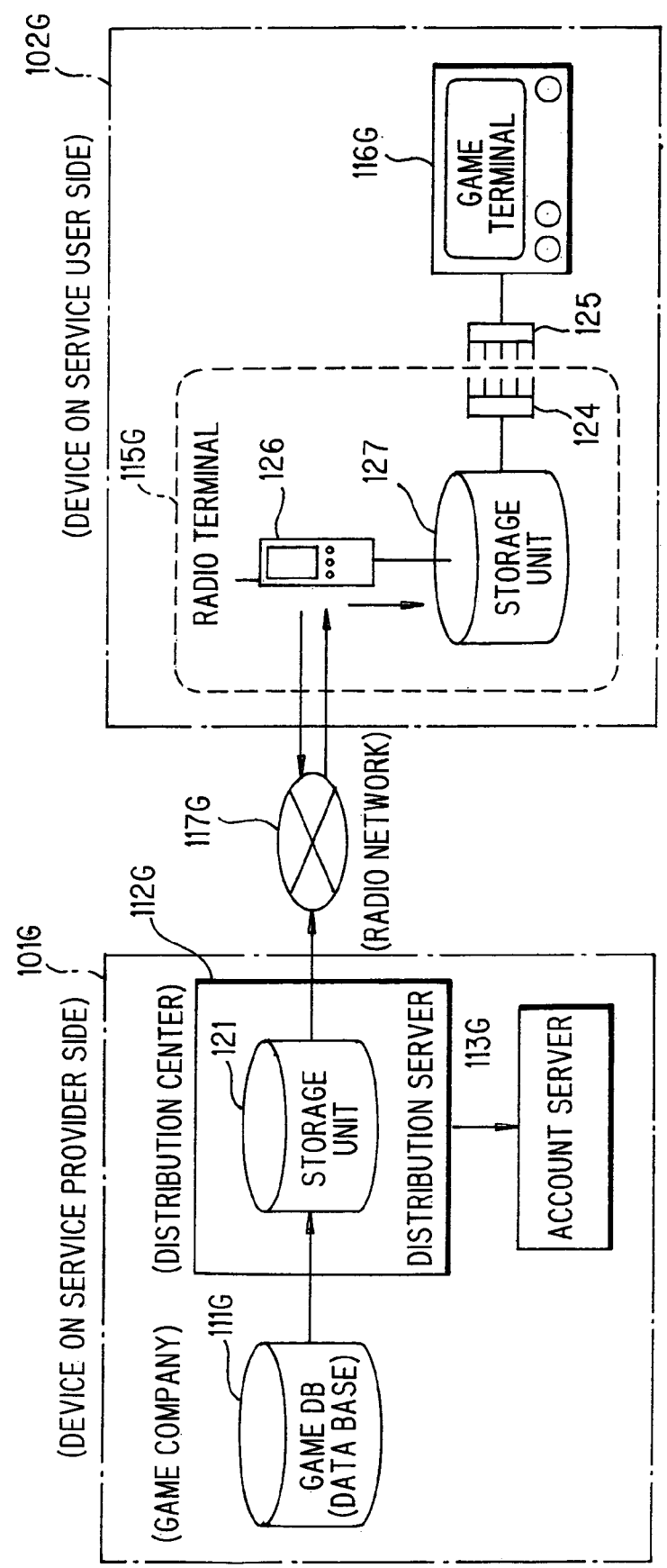
FIG. 3 is a system construction diagram specifically showing the construction of a system wherein a device on the service provider side of a game software distributes a game program to a user having a game terminal through the data distribution system in the preferred embodiment shown in FIG. 2.

FIG. 3 is a diagram showing the detailed construction of each component in the system shown in FIG. 2 by taking, as an example, a case where a device on the service provider side of a game software distributes a game program to a user having a game terminal through the data distribution system in the preferred embodiment shown in FIG. 2. The service provider side device 101G comprises: game database 111G given to a game company; a distribution server 112G provided within a distribution center; and an account server 113G. The distribution server 112G comprises, for example, CPU (central processing unit) not shown and, in addition, a storage unit 121 such as magnetic disk.

In the service user side device 102G connected to the service provider side device 101G through the radio network 117G, a radio terminal 115G is connected to a game terminal 116G through dedicated connectors 124, 125. Here the radio terminal 115G comprises a portable telephone 126 and a dedicated storage unit 127. The storage unit 127 has been provided on the assumption that the game program has a relatively large capacity. In a system which deals with only small-size data, when a built-in storage region in the portable telephone 126 is used, the provision of the storage unit 127 can be omitted. Of course, even in the case of relatively large-size data, when the portable telephone 126 side has a large-capacity memory by virtue of a reduction in memory size, the provision of the dedicated storage unit 127 can be omitted.

Figure 4:
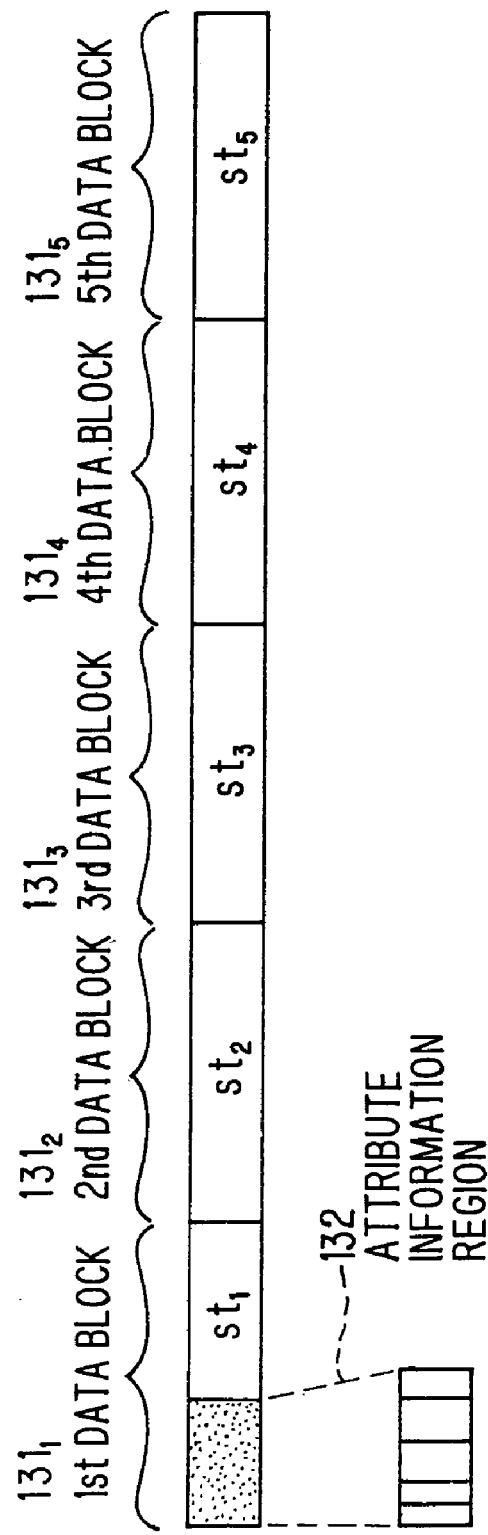
FIG. 4 is a diagram illustrating one embodiment of the structure of distribution data used in the preferred embodiment shown in FIG. 2.

FIG. 4 shows one embodiment of the structure of distribution data used in this preferred embodiment, In this embodiment, regarding the distribution data 130, one game program is divided into first to fifth data blocks $131_1$ to $131_5$, although the number of blocks varies depending upon the total data quantity. Among these blocks, the first data block $131_1$ comprises: an attribute information region 132, which describes attribute information such as the type of data as distribution data 130, the outline of a game program, the total number of data blocks 131, and the amount of the equivalent; and a pay data region $st_1$ located next to the attribute information region 132. The pay data region $st_1$ stores the initial part of the corresponding game program. The second to fifth data blocks $131_2$ to $131_5$ next to the pay data region $st_1$ successively store the remaining part of the game program.

The first data block $131_1$ is distributed to all users, who provisionally wish to receive the distribution of the game program, registered in the data distribution system, before the sale or the fixed time of the start of use of the game program. Upon the distribution of the first data block $131_1$, the users can reproduce the contents of the attribute information region 132 by means of the game terminal 116G (FIG. 3). For example, after the play of the game of the trial version stored as the attribute information region 132, the user can decide whether or not the user finally wishes to purchase the game program.

FIG. 5 shows one embodiment of the attribute information region. The attribute information region 132 is divided into a region 132A, which describes various items, and a region 132B which describes the contents of the items. In this embodiment, "Name of data" (name of game program) is "Conspiracy of Borgia," "Type of data" is "Game program." "Date and time of start of use" in this game program is "0.0.0 a.m. on June 20, 2000." The game program cannot be used until this date and time, even when the equivalent to the game program has been paid before this date and time.

"Date and time of end of use" is "11.59.59 p.m. on December 31, 2020," and the use of the program after that is prohibited. This date is a time, defined by the producer of the game, up to which the game can be properly operated, assuming that the specifications of the game terminal 116G would be changed in the future. Within the period of time, for example, an improvement in the program corresponding to a change in design of the hardware or the like is made through the radio network 117G. After this period of time, the play per se of the game is prohibited. This is for clarifying the period of time in which the responsibility for the game program is on the game producer side. It is matter of course that, for some game programs, the "Date and time of start of use" or "Date and time of end of use" may not be provided.

The date and time are principally managed by means of a clock mechanism on the game terminal 116G side. When importance is attached to fairness among users as in the case of "Date and time of start of use," however, the date and time are managed by a clock mechanism on the distribution server 112G side at the time when the radio terminal 115G has been connected to the distribution server 112G. More specifically, every time when the radio terminal 115G is connected to the distribution server 112G, the distribution server 112G checks the clock on the radio terminal 115G side. When the error level exceeds an acceptable range, data on the instruction for the correction of date and time may be sent to the radio terminal 115G.

"Data charge" is a region which, in this embodiment, is used in the period of time of use of the game program. In the attribute information region 132 in this preferred embodiment, two types of charges, "first data charge" and "second data charge," are set. The "first data charge" is a charge for the distribution of all the first to fifth data blocks $131_1$ to $131_5$, and, in this embodiment, is 4890 Japanese yens. On the other hand, the "second data charge" is a charge for the play of a partial program stored in the pay data region $st_1$ in the first data block $131_1$, and, in this embodiment, is 525 Japanese yens. When the game is fun and the user further wishes to play the part of the game in and after the second data block $131_2$, the user should pay the service charge for the second to fifth data blocks $131_2$ to $131_5$. For some types of games or game companies, a method may be used wherein no limitation on the contents per se of data to be distributed is provided, the period of time between the "date and time of start of use" and the "date and time of end of use" is set to a short period of time, for example, one day or three days, and the equivalent to the use of the game in this limited period of time is set to a low one as the second charge.

The "total data quantity" indicates the data quantity of the game program distributed. The data quantity may be indicated, instead of the above total quantity, in terms of the number of the data blocks 131, for example, the first to fifth data blocks $131_1$ to $131_5$. In the embodiment shown in FIG. 5, the data quantity is 2048000 bytes as expressed in terms of decimal number.

Thus, in the data distribution system in the present preferred embodiment, the first data block $131_1$ is first distributed to the storage unit 127 (FIG. 3) of users who provisionally wish to purchase the game program, before the sale or authorization of, use of the game program. Therefore, the user can previously check the outline of the contents or the trial version and then can decide whether or not the user finally wishes to purchase the game program. Further, since a method may be used which permits the users, who have indicated their intension of wishing to purchase the game program, to utilize the data in the already distributed pay data region $st_1$ on the date of sale or the date and time of the start of use, the users can start the play of the game without the receipt of the distribution of a large quantity of data. The distribution server 112G side can send the contents of the second to fifth data blocks $131_2$ to $131_5$ at proper intervals according to the a status of progress of the game in the users, who have indicated the intention of wishing to purchase the game program, or according to the data transfer rate of the radio network 117G determined in relationship with the portable telephone 126 used by these users, or alternatively can send the contents of the second to fifth data blocks $131_2$ to $131_5$ while varying the priority of transmission according to the status of the proceeding of the game in the users. This can contribute the dispersion of load.

Figure 6:
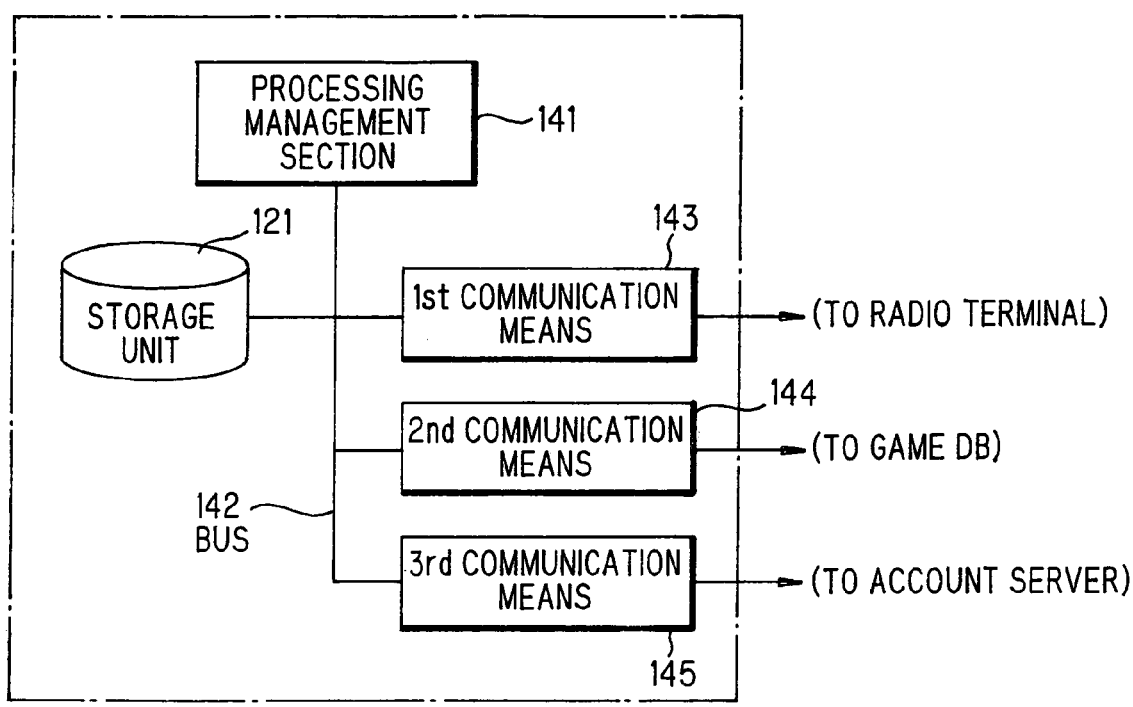
FIG. 6 is a block diagram showing the construction of a distribution Server shown in FIG. 2.

FIG. 6 shows the construction of the distribution server in the data distribution system according to this preferred embodiment. The distribution server 112G, which has also been shown in FIG. 3, is provided with a processing management section 141 for controlling the whole distribution server 112G. The processing management section 141 comprises CPU (central processing unit), a storage medium storing a control program, and RAM (a random access memory) as a working memory (each not shown), and is connected to the storage unit 121 and the first to third communication means 143 to 145 through a bus 142. Here the first communication means 143 is means for communication with the portable telephone 126 through the radio network 117G shown in FIG. 3, and the second communication means 144 is means for communication with the game database 111G in the game company shown in FIG. 3. Likewise, the third communication means 145 is means for communication with the account server 113G shown in FIG. 3.

Figure 7:
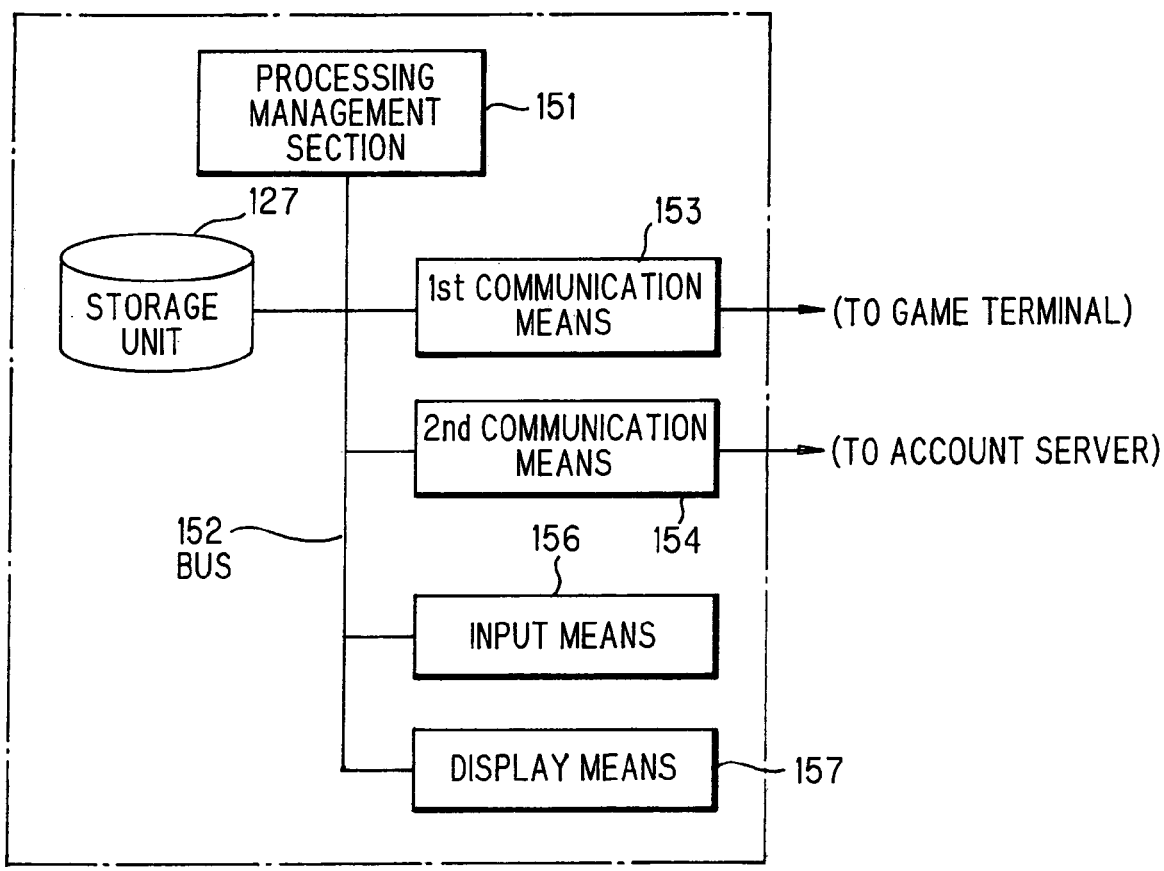
FIG. 7 is a block diagram showing the construction of a radio terminal shown in FIG. 2.

On the other hand, FIG. 7 shows the construction of the radio terminal shown in FIG. 3. The radio terminal 115G is provided with a processing management section 151 for controlling the whole radio terminal 115G. The processing management section 151 comprises CPU, a storage medium storing a control program, and RAM as a working memory (each not shown), and is connected, through a bus 152, to first and second communication means 153, 154, input means 156, such as an operation panel, and display means 157, such as a liquid crystal display. Here the first communication means 153 is means for communication with the game terminal 116G, and the second communication means 154 is means for communication with the distribution server 112G through the radio network 117G.

Likewise, the account server 113G and the game terminal 116G shown in FIG. 3 comprise CPU, a storage medium storing a control program, and RAM as a working memory (each not shown). In each case, the control is performed according to a predetermined procedure. However, showing these by drawings is omitted.

Figure 8:
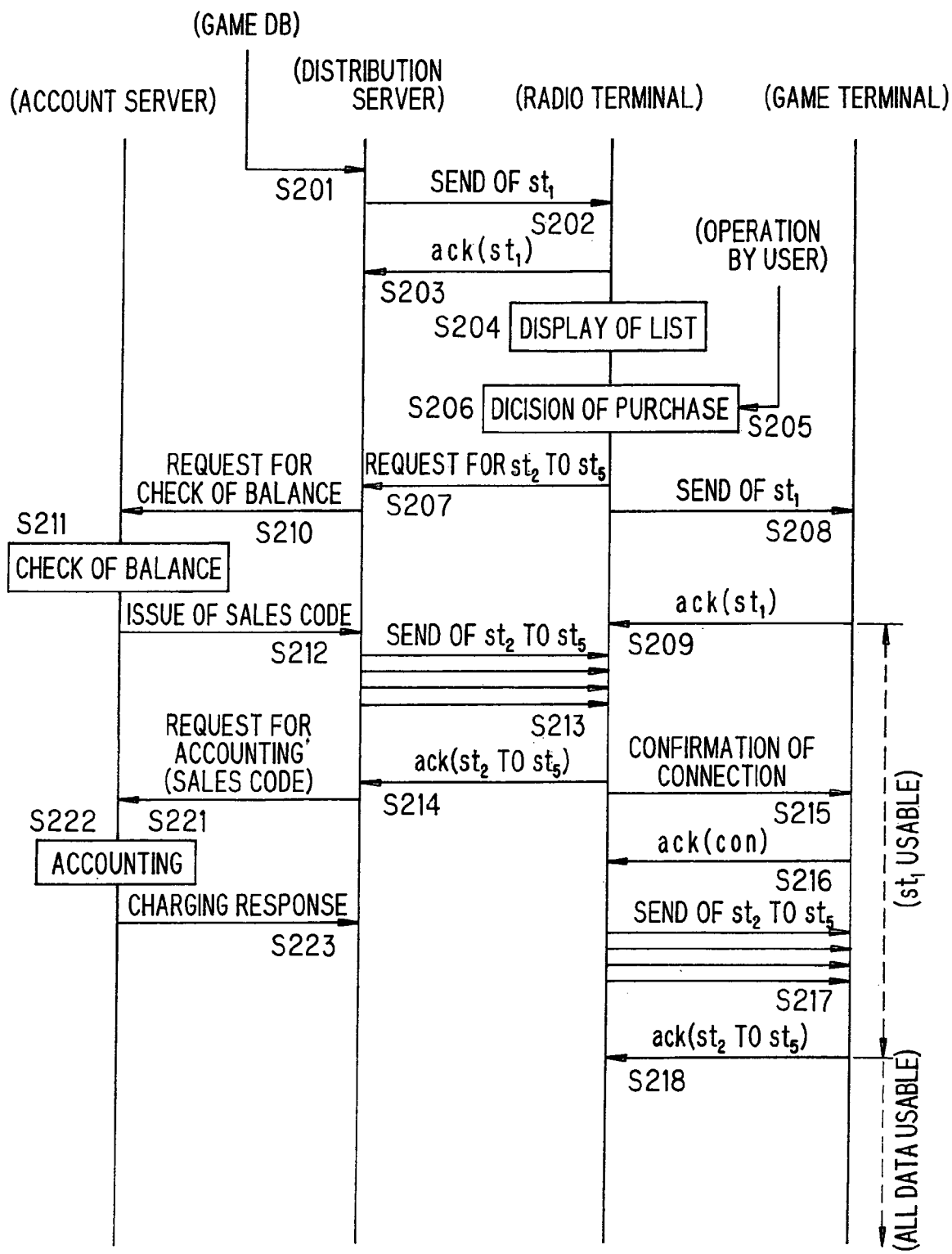
FIG. 8 is a diagram illustrating the whole control operation of the data distribution system in the preferred embodiment shown in the preferred embodiment shown in FIG. 2.

FIG. 8 shows the whole control operation of the above data distribution system. Upon the completion of a game program, the game database (game DB) 111G shown in FIG. 3 divides the game program into first to fifth data blocks $131_1$ to $131_5$, as shown in FIG. 4, which are then sent to the distribution server 112G (step S201). Upon the receipt of the first to fifth data blocks $131_1$ to $131_5$, the distribution server 112G sends the first data block $131_1$ among the first to fifth data blocks $131_1$ to $131_5$ to a radio terminal 115G in each of the users, who have been previously registered as candidate users for the purchase of the game, even before the date and time of the start of use (step S202). This transmission may be carried out at any time so far as the first data block $131_1$ reaches the radio terminal 115G before the fixed date and time of the start of use. Therefore, a time zone, in which distribution processing is not generally carried out, may be selected for sending the first data block $131_1$. As soon as the first data block $131_1$ has been sent to the radio terminal 115G, an acknowledge (ack) signal indicating the completion of the receipt of the first data block $131_1$ is sent to the distribution server 112G side (step S203).

In this state, the radio terminal 115G side displays, based on the attribute information region 132, a list of the contents of the game program, for example, on a liquid crystal display (not shown) (step S204). The user sees this list, and operates the portable telephone 126 (step S205). In this case, when there is a favorite game program in the list, the user performs an operation for purchasing the game program is performed (step S206). Based on this, the radio terminal 115G side notifies the distribution server 112G side of a request for the purchase of the second to fifth data blocks $131_2$ to $131_5$ (step S207). Upon the arrival of the fixed time of the start of use, the pay data region $st_1$, in the first data block $131_1$ is sent to the corresponding game terminal 116G (step S208). Upon the receipt of the pay data region $st_1$, the game terminal 116G sends an acknowledge signal to the radio terminal 115G side (step S209).

On the other hand, the distribution server 112G side, which has received a request for the purchase of the second to fifth data blocks $131_2$ to $131_5$, makes a request to the account server 113G for the check of the user's balance (step S210). The account server 113G checks the balance (step S211), and, when the balance is satisfactory for the purchase, a sales code is issued (step S212). Upon the receipt of the sales code, the distribution server 112G sends the second to fifth data blocks $131_2$ to $131_5$ to the corresponding radio terminal 115G (step S213). After the confirmation of the receipt of all the data blocks $131_2$ to $131_5$, the radio terminal 115G sends an acknowledge signal to the distribution server 112G side (step S214). In this connection, it should be noted that the second to fifth data blocks $131_2$ to $131_5$ may be intermittently sent to the radio terminal 115G. In this case, a construction may be adopted wherein, every time when the receipt is made, the radio terminal 115G sends an acknowledge signal to the distribution server 112G side.

As shown in FIG. 8, when the second to fifth data blocks $131_2$ to $131_5$ are continuously or intermittently sent to the radio terminal 115G side, upon the receipt of all the second to fifth data blocks $131_2$ to $131_5$, the radio terminal 115G checks connection to the game terminal 116G (step S215). When the connection is proper, the game terminal 116G sends an acknowledge signal to the radio terminal 115G side (step S216). Now the radio terminal 115G sends the second to fifth data blocks $131_2$ to $131_5$, which has already been received and stored in the dedicated storage unit 127, to the game terminal 116G, (step S217). Upon the receipt of the second to fifth data blocks $131_2$ to $131_5$, the game terminal 116G sends an acknowledge signal to the radio terminal 115G (step S218). As soon as the acknowledge signal has been sent to the radio terminal 115G in the step S209, the first data block $131_1$ can be utilized. Upon the transmission of the acknowledge signal to the radio terminal 115G in the step S218, the whole program of the game can be utilized.

On the other hand, upon the confirmation of the completion of the distribution of the second to fifth data blocks $131_2$ to $131_5$ in the step S214, the distribution server 112G shows the sales code to the account server 113G and makes a request for accounting (step S221). Based on this, the account server 113G performs accounting for the user (step S222). Upon the completion of accounting, the account server 113G notifies the distribution server 112G of this effect (step S223) to complete the whole processing regarding the distribution of the program of the game.

Next, some of the above processings in the data distribution system in the present preferred embodiment will be explained in more detail.

Figure 9:
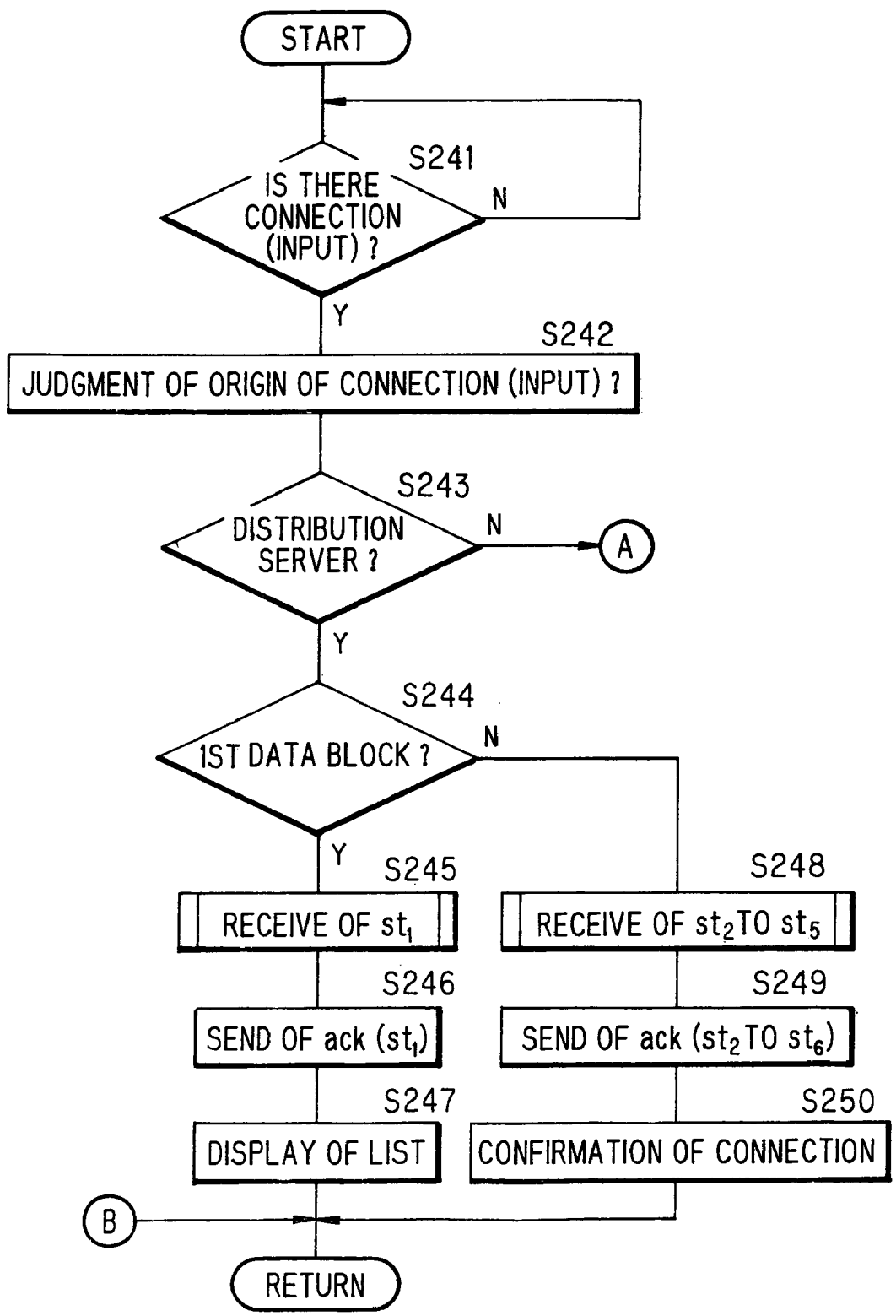
FIG. 9 is a flow diagram specifically showing the first part of processing by the radio terminal in the preferred embodiment shown in FIG. 2.

FIG. 9 is a flow diagram specifically showing the first part of processing by the radio terminal. When connection is present (step S241: Y), the radio terminal 115G judges the origin of the connection (step S242). In the data distribution system in this preferred embodiment, the origin of connection is any one of the distribution server 112G, its own user interface (I/F), and the game terminal 116G. When the connection origin is the distribution server 112G (step S243: Y), judgment is made on whether or not the connection is associated with the first data block $131_1$ or the second to fifth data blocks $131_2$ to $131_5$ as the other data blocks (step S244).

When the connection is associated with the first data block $131_1$ (Y), as described in FIG. 8, the radio terminal 115G receives data of the first data block $131_1$ from the distribution server 112G (step S245), sends an acknowledge signal to the distribution server 112G side (step S246), and displays a list of the received attribute information (step S247), followed by return again to the processing in the step S241 (Return).

On the other hand, when the connection is associated with the second to fifth data blocks $131_2$ to $131_5$ (step S244: N), the radio terminal 115G receives the second to fifth data blocks $131_2$ to $131_5$ (step S248). Upon the completion of the receipt of the second to fifth data blocks $131_2$ to $131_5$, the radio terminal 115G sends an acknowledge signal to the distribution server 112G side (step S249), and confirms connection to the game terminal 116G (step S250), followed by return again to the processing in the step S241 (Return).

Figure 10:
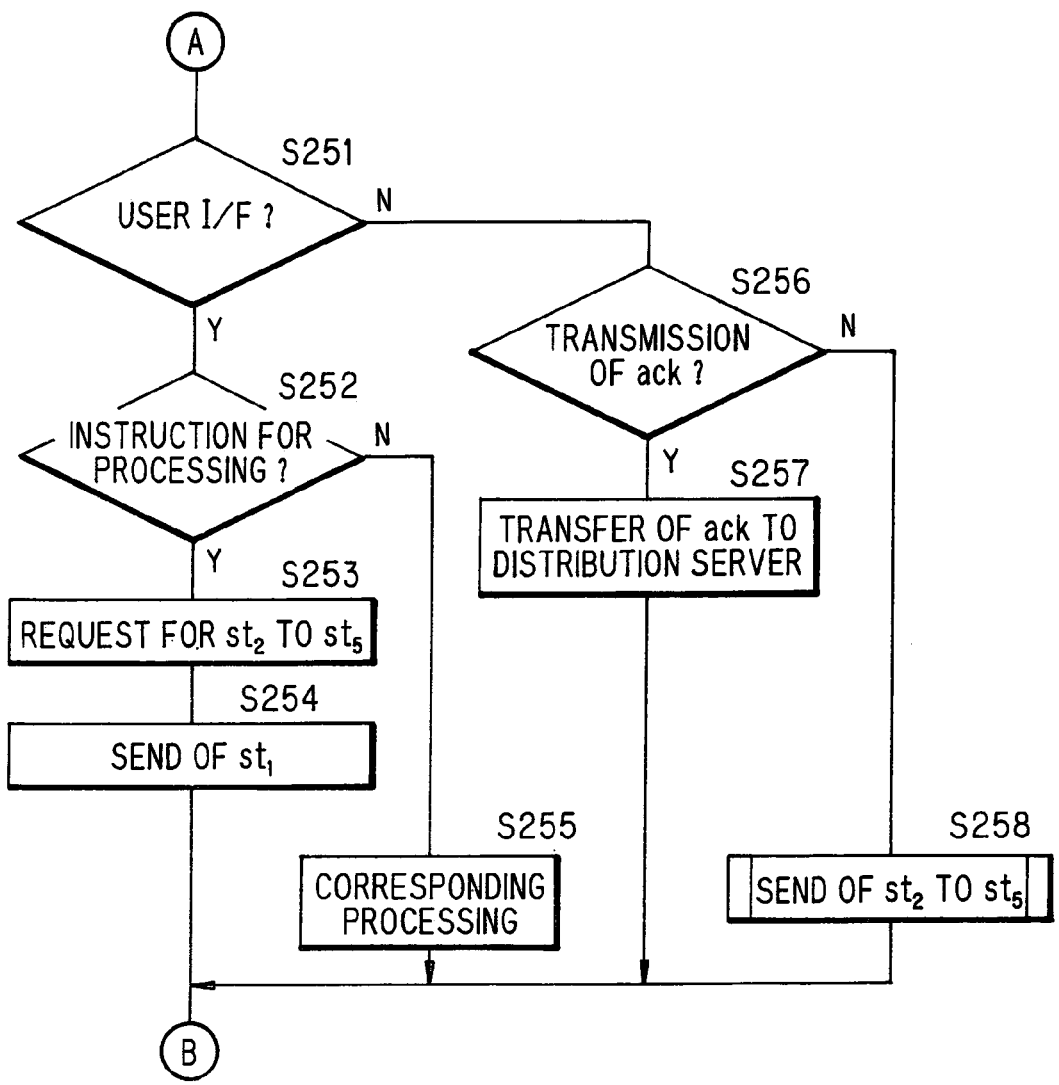
FIG. 10 is a flow diagram specifically showing the second part of processing by the radio terminal in the preferred embodiment shown in FIG. 2.

FIG. 10 shows the second part of processing by the radio terminal. When the origin of connection to the radio terminal 115G is its own user interface (step S243: N, step S251: Y), judgment is made on whether or not the input is associated with an instruction for purchasing the game program (step S252). When the input is for instructing the purchase of the game program (Y), the radio terminal 115G makes a request to the distribution server 112G for the transmission of the second to fifth data blocks $131_2$ to $131_5$ (step S253), reads the already received first data block $131_1$ from the dedicated storage unit 127 (see FIG. 3), and sends the first data block $131_1$ to the game terminal 116G (step S254). Upon the receipt of the data, the game terminal 116G stores the data in a built-in storage medium (not shown). This enables the play of the game in its program portion regarding the first data block $131_1$ in the game terminal 116G. When the user interface of the radio terminal per se has performed processing other than this for the portable telephone 126 (step S252: N), the corresponding processing is executed (step S255), followed by return again to the processing in the step S241 (Return)

In the step S251, when the result of the judgment is that the origin of connection to the radio terminal 115G is not its own user interface, that is, is the game terminal 116G (N), judgment is made on whether the request is associated with a request for the transfer of an acknowledge signal to the distribution server 112G or a request for an affirmative answer to the confirmation of the connection (step S256). In the case of the former (Y), an acknowledge signal is sent to the distribution server 112G (step S257) On the other hand, in the case of the latter (step S256: N), the second to fifth data blocks $131_2$ to $131_5$ are sent to the game terminal 116G (step S258). Upon the receipt of these data, the game terminal 116G stores the data in the built-in storage medium. This enables, in the game terminal 116G, the play of the game in its program portion regarding the first data block $131_1$, as well as in the program portion regarding the second to fifth data blocks $131_2$ to $131_5$.

Figure 11:
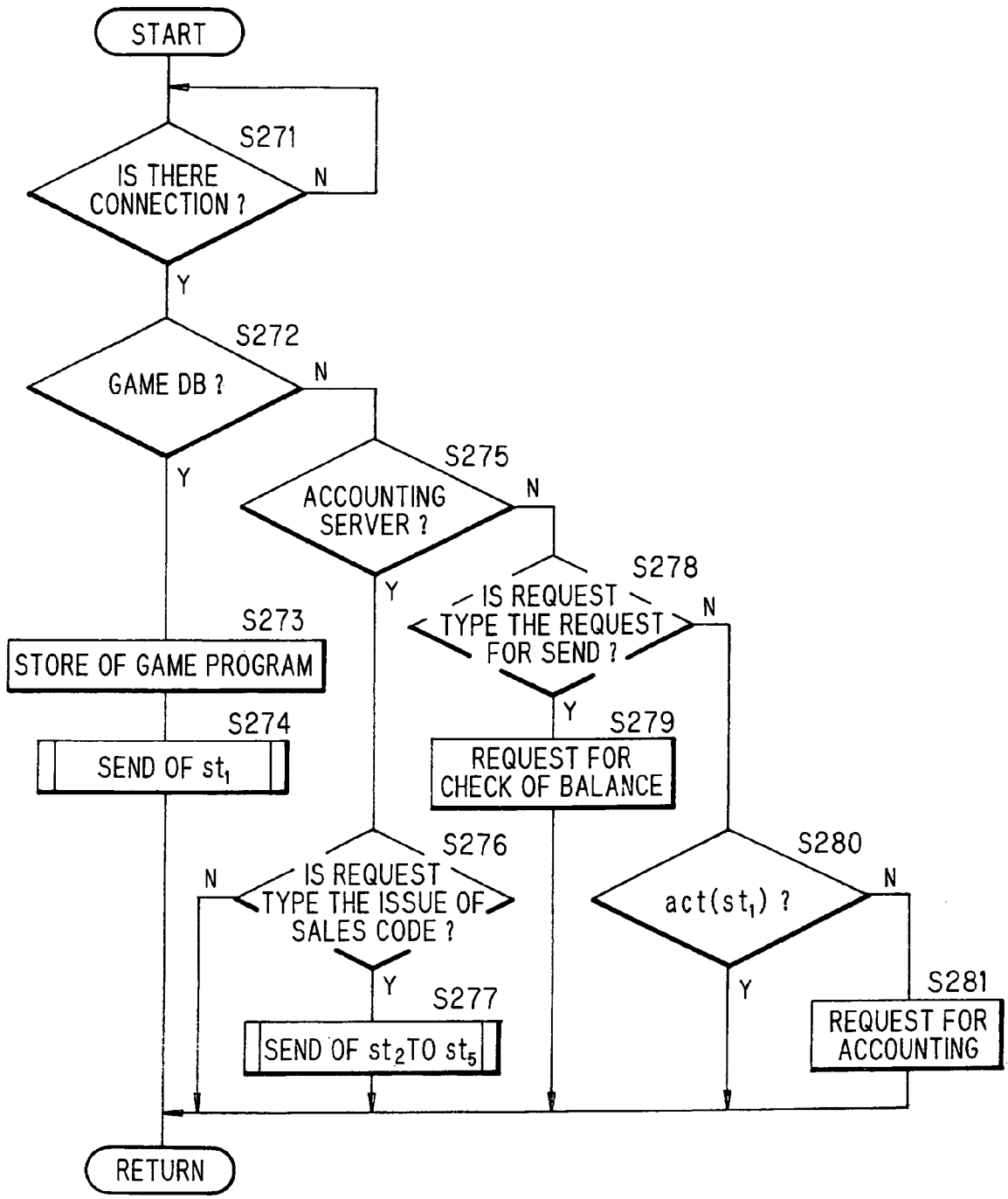
FIG. 11 is a flow diagram specifically showing processing by the distribution server in the preferred embodiment shown in FIG. 2.

FIG. 11 is a diagram specifically showing the processing of the distribution server. When connection to the distribution server 112G is present (step S271: Y), judgment is made on whether or not the origin of connection is the game database 111G (step S272). The result is yes (Y) the game program sent from the game database 111G is stored in the storage unit 121 (step S273). Subsequently, as described above in connection with FIG. 8, among the data blocks, the first data block $131_1$ is sent to the radio terminal 115G (step S274).

On the other hand, when the origin of connection is not the game database 111G (step S272: N), judgment is made on whether or not the origin of connection is the account server 113 (step S275) When the result of judgment is yes (Y), judgment is made on whether or not the type of request is the issue of an sales code (step S276). When the result of the judgment is yes (Y), this means that the program of the game has been sold. Therefore, the second to fifth data blocks $131_2$ to $131_5$ are sent to the corresponding radio terminal 115G (step S277). On the other hand, when the type of request is account response rather than the issue of the sales code (step S276: N), the step is again returned to connection standby processing without particular processing (Return).

In the step S275, when the origin of connection is not the account server 113 (N), the connection origin is the remaining connection origin, that is, the radio terminal 115G. In this case, judgment is made on whether or not the type of request is a request for the transmission of data blocks (step S278). When the result of judgment is yes (Y), a request for the check of balance is made to the account server 113 to learn whether or not the user's balance is satisfactory for purchasing the second to fifth data blocks $131_2$ to $131_5$ (step S279). The step is again returned to connection standby processing (Return).

On the other hand, in the step S278, when the type of request is not the request for the transmission of the data blocks (N), judgment is made on whether or not the type is acknowledgment from the radio terminal 115G with respect to the transmission of the pay data region $st_1$ (step S280). In this case (Y), the step is returned to connection standby processing without particular processing (Return). In the step S280, when the type is acknowledgment with respect to the receipt of data blocks other than the first data block, that is, the second to fifth data blocks $131_2$ to $131_5$ (N), this means that the radio terminal 115G has received the contemplated game program. Therefore, a request for accounting is made to the account server 113 (step S281).

In step S279, data on the request from the distribution server 112G to the account server 113 for the check of balance comprise a signal for requesting the check of balance, an identifier for specifying the corresponding user, and data indicating the equivalent to the game program which the user wishes to purchase. Through the request for the check of balance, the distribution server 112G makes a request to the account server 113 for user authentication and a judgment, based on the user's balance with respect to the amount of utilizable money, on whether or not the user has the ability to pay the equivalent to the contemplated game program. The account server 113 sends a valid sales code to notify the distribution server 112G of the fact that the user can purchase the contemplated game program.

Therefore, when the user cannot purchase the contemplated game program, the account server 113 sends an invalid sales code indicated, for example, by "00000" or a predetermined error code such as "−1."

In the present preferred embodiment, the period of validity is set in the valid sales code. As soon as the completion of the transmission of the distribution data as the game program has been notified within the period of validity, the account server 113 discards the sales code to perform regular accounting. Further, according to the present preferred embodiment, when the sales code is within the period of validity, the corresponding user is handled as being in the state of execution of the receipt of the distribution data. Therefore, during this period, when the same user has requested the distribution data through a distribution server (not shown) other than the distribution server 112G and, consequently, the same request is made to the account server 113, the amount of money, which has been left, is regarded as a balance obtained by subtracting the equivalent to the previous distribution data from the previous balance, followed by judgment on whether or not the balance is satisfactory for meeting the user's request. This can prevent, for the balance corresponding to one distribution data, double issue of a notice indicating that the data can be purchased.

An example thereof will be explained in detail. For user A, assume that the balance of the amount of money for the purchase of distribution data, such as game programs, is 100 yens. Further, assume that, through an operation for the purchase of the first game program, the user purchases the first distribution data to which the equivalent is 90 yens. Upon the user's processing for the purchase of the first distribution data, the distribution server 112G makes a request to the account server 113 for the check of the ability of the user A to pay 90 yens. At this point, the account server 113 notifies the distribution server 112G of the fact that the user can pay 90 yens.

Immediately after that, that is, in such a state that the first distribution data has not been distributed yet, when the user A further performs an operation for the purchase of the second distribution data to which the equivalent is 80 yens. As with the case of the first distribution data described above, the distribution server 112G makes a request to the account server 113 for the check of the ability of the user A to pay 80 yens. At that time, when the balance of the amount of money for the user A managed by the account server 113, which can purchase the data, retains unchanged, that is, 100 yens, the account server 113, as with the case of the first distribution data, gives a notification that the user A can pay 80 yens. Consequently, when the payment of both the first and second distribution data is made, there is a fear of the balance becoming insufficient. Therefore, in this case, the payment for any one of the first and second distribution data often falls into arrears.

In order to prevent the occurrence of this unfavorable situation, upon the receipt of the request for the check of balance, the account server 113 stores, as the balance under processing, the amount of money obtained by subtracting the equivalent to the distribution data under distribution processing from the actual balance. Upon the receipt of a request for accounting (step S221 in FIG. 8) as a result of the completion of the distribution of the distribution data based on the issue of the sales code (for example, the transmission of the second to fifth data blocks $131_2$ to $131_5$ in the step S213 in FIG. 8), the account server 113 discards the sales code and performs formal accounting to establish the new balance. The above processing can avoid such a situation that a notification is given that the user can pay both the equivalent to the first distribution data and the equivalent to the second distribution data.

Further, in the present preferred embodiment, the period of validity is provided in the sales code. In spite of the fact that there have been a request for the check of balance, when there is no request for accounting corresponding to this request (see step S221 in FIG. 8), including the case of interruption of the distribution processing, within the period of validity, the account server 113 discards the sales code. In this case, 10 yens as the balance under processing (the amount of money obtained by subtracting 90 yens as the equivalent to the first distribution data from 100 yens) is returned to 100 yens which is the amount of money before the request for the check of balance, that is, before the subtraction of the amount of money under the processing for purchase.

Figure 12:
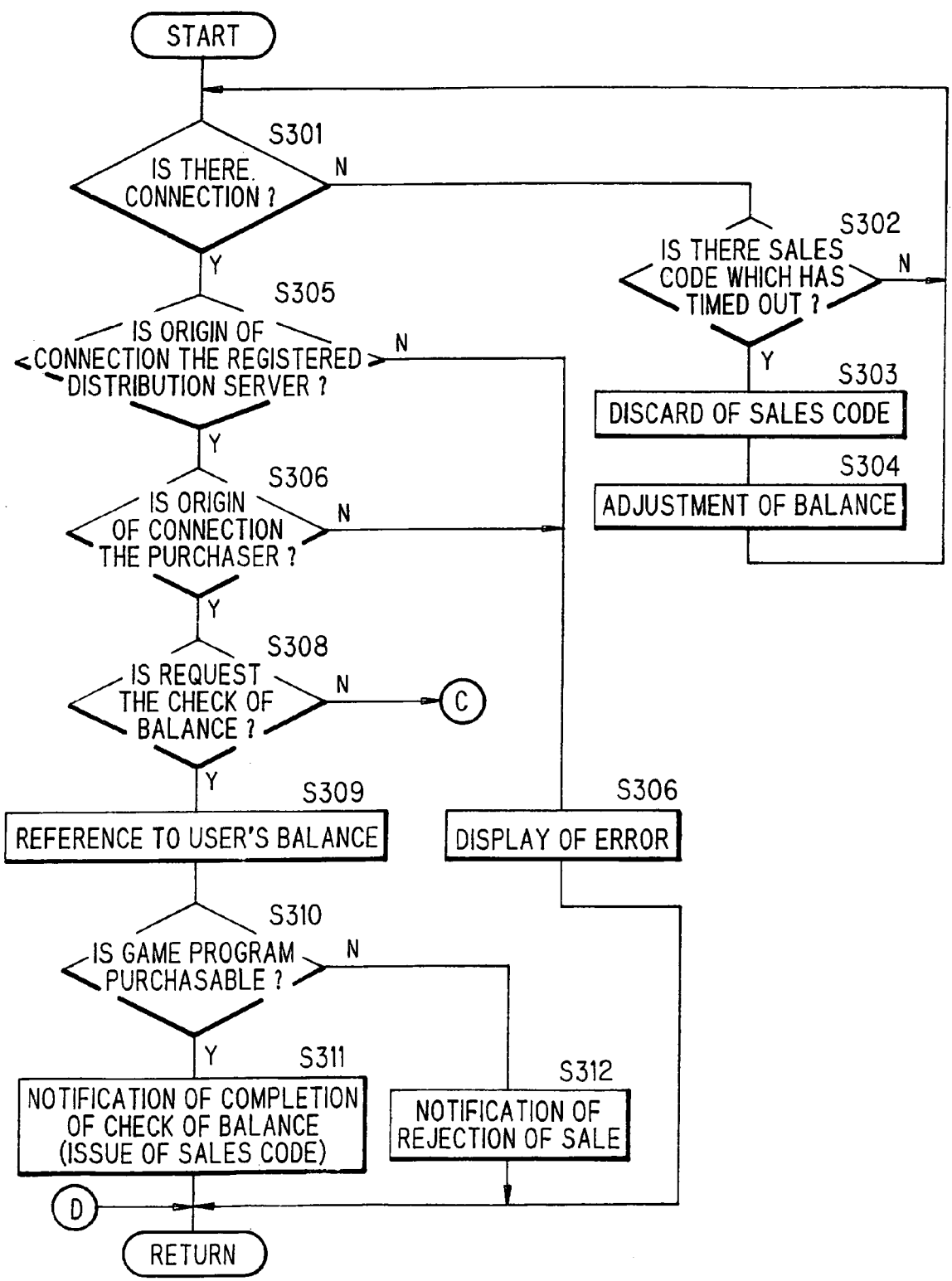
FIG. 12 is a flow diagram specifically showing a part of processing by an account server in the preferred embodiment shown in FIG. 2.

FIG. 12 is a diagram specifically showing a part of processing by the account server. The account server 113 monitors the connection of the distribution server 112G (step S301). In such a state that connection is not made (N), the account server 113 checks the sales codes stored in a build-in memory (not shown) for the presence of a time-out code (step S302). When the time-out sales code is present (Y), the account server 113 discards the sales code (step S303). In this case, the user's balance is returned to the amount of money in the case where the user did not purchase the contemplated game program (step S304).

On the other hand, upon connection to the distribution server 112G (step S301: Y), the account server 113 confirms, through authentication, whether or not the origin of connection is the previously registered distribution server 112O (step S305), When the origin of connection is not the registered distribution server 112G (N), an error indication is made (step S306), followed by return of the processing again to the state of the step S301 (Return).

When the distribution server 112G has been confirmed to be a registered regular server (step S305: Y), judgment is made on whether or not the user as the purchaser of the game program is a person who has been registered in the account server per se (step S307). This judgment can be made by the retrieval of a purchaser database not shown. When the user could not have been verified to be a registered one (N), an error indication is made (step S306), followed by return of the processing again to the state of step S301 (Return).

When the account server 113 has verified that the user is an account object (step S307: Y), judgment is made on whether or not the request is one for the check of balance (step S308). When the result of the judgment is yes (Y), the user's balance is checked (step S309). The equivalent of the game program to be purchased is compared with the balance to judge whether or not the user can purchase the game program (step S310). In this case, as described above, the balance is the amount of money obtained by subtracting the amount of money under processing for the purchase from the previous balance. For example, assuming that the balance is 10000 yens and the amount of money including the sales tax for the purchase of the game program is 4890 yens, the game program is judged to be purchasable. In this case (Y), a sales code is issued, and a notification of the completion of the check of balance is given (step S311).

On the other hand, when the amount of money for the purchase exceeds the balance, the result of the judgment is that the user cannot purchase the game program. In this case (step S310: N), a notification is given to the effect that the purchase of the game program is impossible (step S312). This notification is performed by sending a predetermined invalid sales code (a sales code such as the above-described "−1") to the distribution server 112G.

Figure 13:
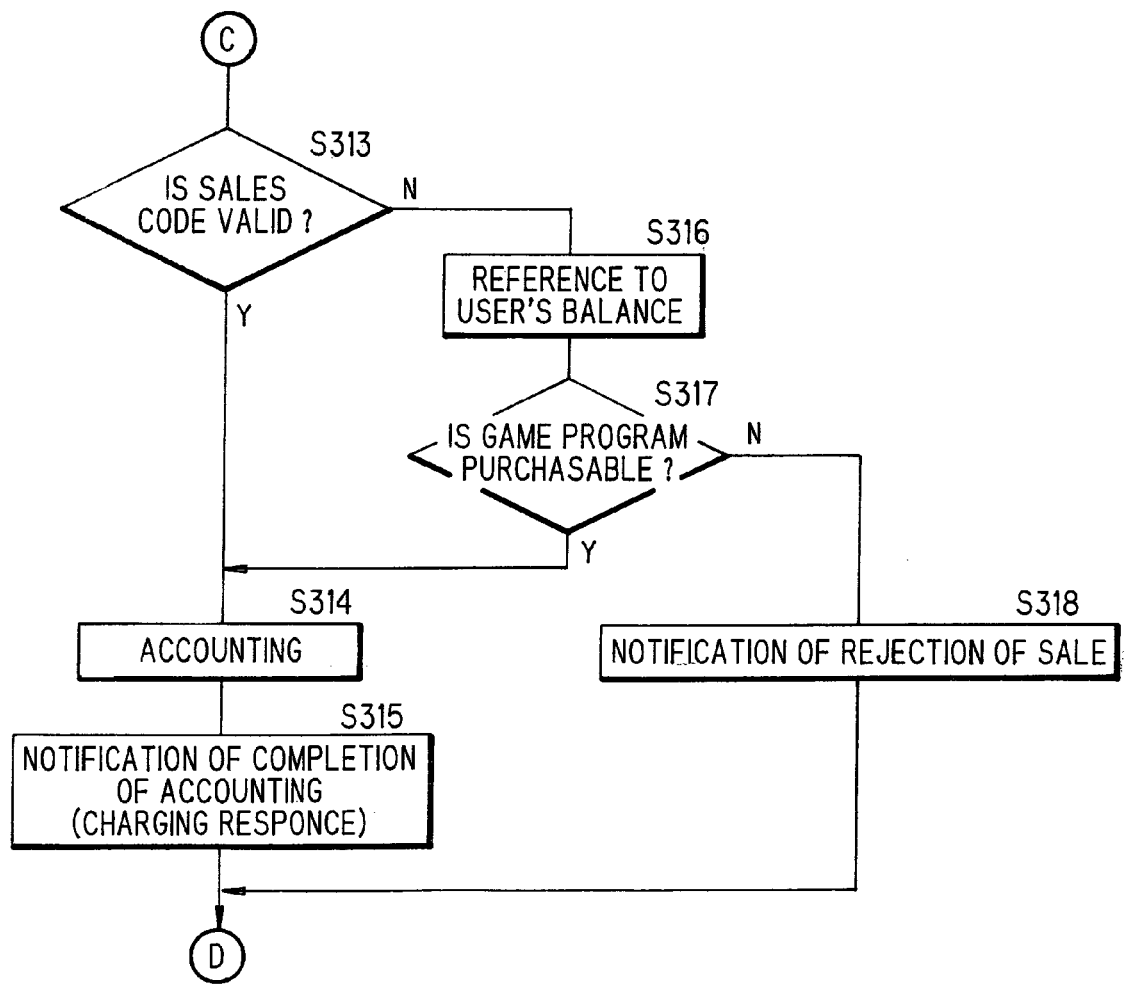
FIG. 13 is a flow diagram showing the flow of processing after step S308 when the request from the distribution server in the step S308 is the request for accounting.

FIG. 13 is a flow diagram showing the flow of processing after step S308 when the request from the distribution server 112G in the step S308 is not the request for the check of balance, that is, is the request for accounting (step S308 in FIG. 12: N), the issued sales code contained in the request is checked for the validity (step S313). When the sales code is valid (Y), accounting is carried out (step S314) and a notification of the completion of the accounting is performed as the accounting response (step S315), followed by return of the processing to the step S301 (Return). The accounting in the step S314 is, for example, the demand for the payment of charge to the user's bank account or credit card number.

In the step S313, when the sales code has been judged to be invalid (N), the user's balance is again checked (step S316). In the case of a user who has designated a credit card as the payee, the balance is defined as follows, The upper limit value of monthly utilizable amount in the card is multiplied by a predetermined ratio such as 0.3. The amount of money, which has been confirmed, by the account server 113, as the amount of money paid by the user in that month is subtracted from the above obtained value. The value thus obtained is regarded as the balance. As a result, when the game program has been judged to be purchasable (step S317: Y), the step is transferred to the step S314 for accounting. On the other hand, when the result of the judgment is that the purchase of the game program is impossible (step S317: N), a notification of the rejection of sale is issued (step S318). This completes the processing (Return). The notification of the rejection of sale may be the same as the notification in the step S312.

First Variant

Figure 14:
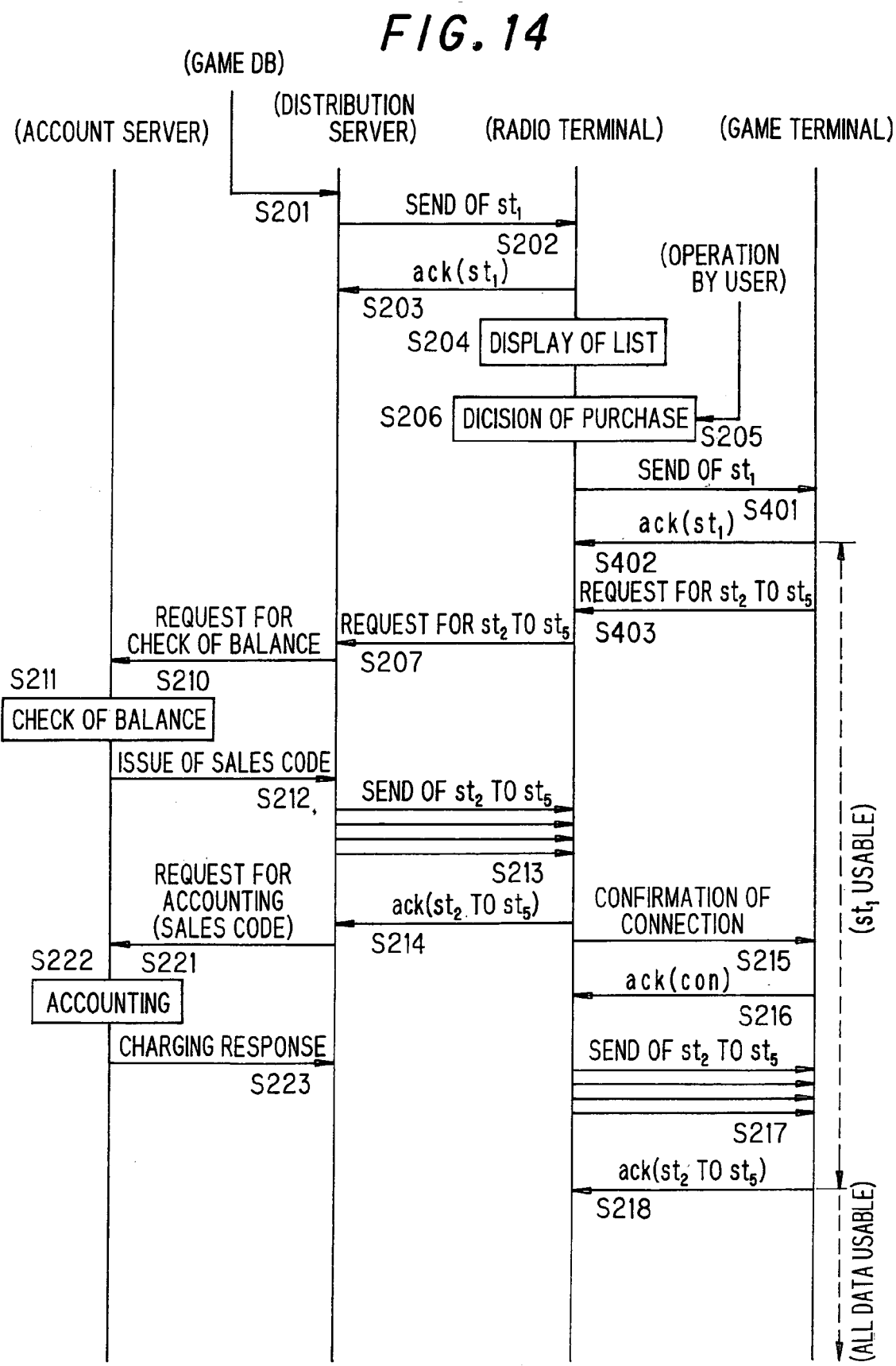
FIG. 14 is a diagram illustrating the whole control operation of a data distribution system in a first variant of the invention.

FIG. 14 shows the whole control operation of a data distribution system in the first variant of the invention. This drawing corresponds to FIG. 8 (the above preferred embodiment). Accordingly, in FIGS. 14 and 8, like parts are identified with the same reference numerals, and the explanation thereof will be omitted. In the data distribution system according to this variant, the user operates a portable telephone 126 to examine the contents of the game program (step S205), and, when the user has decided to purchase this game program, performs an operation (decision) for the purchase of the game program (step S206). Up to this stage, this variant is quietly identical to the above preferred embodiment. Thereafter, in the above preferred embodiment, based on this, the radio terminal 115G side makes a request to the distribution server 112G side for the purchase of the second to fifth data blocks $131_2$ to $131_5$ (step S207 in FIG. 8)

On the other hand, in the case of the first variant shown in FIG. 14, based on the decision of purchase in the step S206, when this point in time is at or after the fixed time of the start of use, the radio terminal 115G immediately sends the pay data region $st_1$ in the first data block $131_1$ to the corresponding game terminal 116G (step S401). Upon the receipt of the pay data region $st_1$, the game terminal 116G sends an acknowledge signal to the radio terminal 115G side (step S402). Thereafter, upon the transmission, from the game terminal 116G side to the radio terminal 115G, of a request for the purchase of the subsequent second to fifth data blocks $131_2$ to $131_5$, (step S403), in this point, the radio terminal 115G for the first time makes a request to the distribution server 112G side for the purchase of the second to fifth data blocks $131_2$ to $131_5$ (step S207). The processing after that is identical to the processing in the above preferred embodiment.

Thus, the above preferred embodiment is based on the assumption that the user purchases the whole game program in a blanket purchase manner. On the other hand, in the first variant of the invention, so far as the user does not make a request for the purchase of the second to fifth data blocks $131_2$ to $131_5$, no charging for these blocks occurs.

Second Variant

Figure 15:
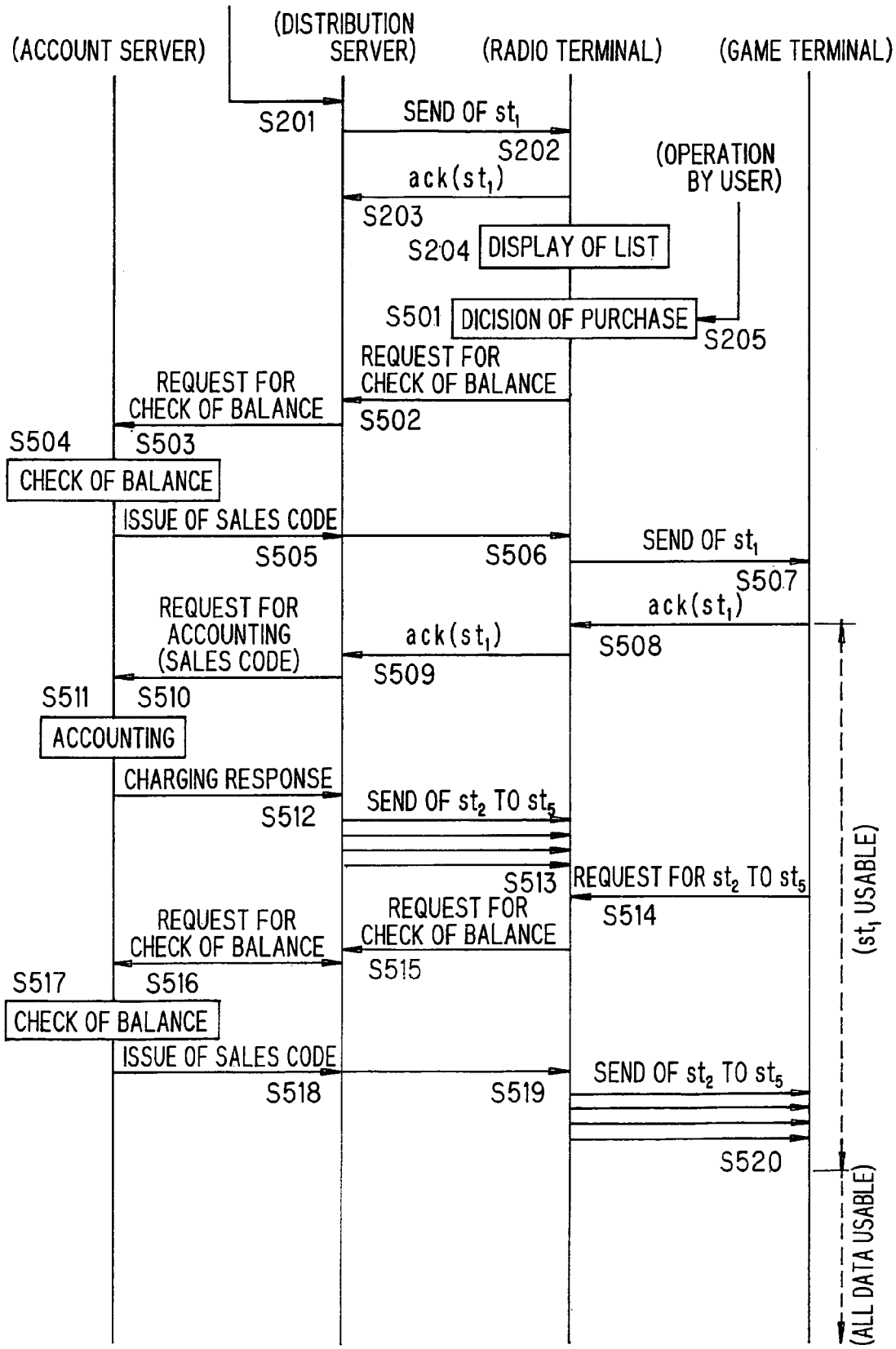
FIG. 15 is a diagram illustrating the principal part in the whole control operation of a data distribution system in a second variant of the invention.

FIG. 15 shows the principal part of the whole control operation in the data distribution system in the second variant of the invention. Also in the FIG. 15 and 8, like parts are identified with the same reference numerals, and the explanation thereof will be omitted. Up to the stage wherein the radio terminal 115G side displays a list of the contents of the game program based on the attribute information region 132 (step S204), the second variant is identical to the above preferred embodiment.

Thereafter, the user can provisionally decide to purchase the first data block $131_1$ (step S501). In this case, the radio terminal 115G makes a request to the distribution server 112G for the check of balance for the purchase of this data (step S502). The distribution server 112G sends this request to the account server 113 (step S503). Based on this, the account server 113G checks the user's balance (step S504). When the balance is satisfactory for the purchase of the first data block, the account server 113G issues a sales code (step S505). Upon the receipt of the sales code (step S506), the radio terminal 115G sends the first data block $131_1$ stored in the storage unit 127 to the game terminal 116G (step S507). From this point in time, the game based on the first data block $131_1$ can be played.

Upon the receipt of the first data block $131_1$, the game terminal 116G sends an acknowledge signal to the radio terminal 115G (step S508). This acknowledge signal is transferred from the radio terminal 115G to the distribution server 112G (step S509). Based on this, the distribution server 112G confirms the distribution of the first data block $131_1$. The distribution server 112G then indicates the sales code to the account server 113G and makes a request to the account server 113G for accounting (step S510). Based on this, the account server 113G performing accounting for the user (step S511). After the completion of the accounting, the account server 113G notifies the distribution server 112G of the completion of accounting (step S512).

Upon the receipt of this notification, in expectation of a request from the game terminal 116G side for the distribution of the second to fifth data blocks $131_2$ to $131_5$, the distribution server 112G previously sends these data blocks (step S513). A construction may be adopted such that the second to fifth data blocks $131_2$ to $131_5$ are sent to the radio terminal 115G only once. Alternatively, for some systems, the following construction may be adopted. Only the second data block $131_2$ is first sent. In this case, the period of time between the distribution of the first data block $131_1$ in the step S507 and the request for the transmission of the second data block $131_2$, which will be explained next, is measured to estimate the rate of progress of the game. The remaining the third to fifth data blocks $131_3$ to $131_5$ are then sent according to the rate of progress of the game. In the second variant, the second to fifth data blocks $131_2$ to $131_5$ are sent at a time to the radio terminal 115G while selecting a time zone where high load is not applied to the distribution server 112G.

In this way, when the transmission from the distribution server 112G to the radio terminal 115G has been previously carried out, in general, thereafter, there is a request from the game terminal 116G for the purchase of the second to fifth data blocks $131_2$ to $131_5$ (step S514). As soon as this request has reached the radio terminal 115G, the radio terminal 115G again sends a request to the distribution server 112G for the check of balance (step S515). The distribution server 112G sends this request to the account server 113 (step S516) Based on this, the account server 113G checks the balance (step S517). When the balance is satisfactory for the purchase, the account server issues a sales code (step S518). Upon the receipt of the sales code (step S519), the radio terminal 115G sends the second to fifth data blocks $131_2$ to $131_5$ stored in the storage unit 127 to the game terminal 116G (step S520). From this point in time, the game based on the first to fifth data blocks $131_1$ to $131_5$ can be played on the game terminal 116G side. In the second variant, the control after that is substantially identical to that in the above preferred embodiment, and, thus, the explanation thereof will be omitted.

In the above-described preferred embodiments and variants, the distribution of pay data has been explained by taking a game program as an example. However, it should be noted that this is of course true of the distribution of other pay data.

Further, in the preferred embodiment, for distribution data, the time of the start of use is fixed. However, the invention is not limited to this. Specifically, also in the case of distribution data for which the time of the start of use is not particularly fixed, when a part of the distribution data, together with attribute data, is first distributed, the time of purchase by users can be dispersed and, at the same time, load on the distribution server can be reduced as compared with the case where the whole distribution data is distributed at a time.

As described above, according to the first and second features of the invention, a partial data comprising a part of the distribution data is temporarily distributed to a storage region provided on each user side, and the reproduction of the data by the purchaser is released. By virtue of this, the distribution of the whole distribution data at a time can be avoided, and, thus, the load on the distribution server can be reduced. Further, for the attribute data contained in the distributed partial data, since the user can see or listen before the decision of the purchase, the partial data can be utilized as a trial version. This can promote the sales of the distribution data and, in addition, can prevent erroneously purchasing uncontemplated contents.

According to the third and fourth features of the invention, a partial data comprising a part of the distribution data, for which the time of the start of use has been fixed, is temporarily distributed to a storage region provided on each user side, and, at or after the fixed time of the start of use, the reproduction of the partial data by the purchaser is released. By virtue of this, the distribution of the whole distribution data at a time at the fixed time of the start of use can be avoided. Thus, the load on the distribution server can be reduced, and, in addition, the time necessary for each user to start the reproduction of the data can be shortened. Further, for the attribute data contained in the partial data distributed before the fixed time of the start of use, since the user can see or listen before the arrival of the fixed time of the start of use, the partial data can be utilized as a trial version. This can promote the sales of the distribution data and, in addition, can prevent erroneously purchasing uncontemplated contents.

Further, according to the second or fourth feature of the invention, as soon as the distribution of a part or the whole of the undistributed remaining part of the data corresponding to the partial data has been requested, the payment ability judgment means judges whether or not the user can pay the equivalent to the distribution data. When the result of the judgment by the payment ability judgment means is that the user can pay the equivalent, the requested data is distributed to the corresponding user side. Therefore, reliable payment of the equivalent to the distributed data can be realized. Further, rather than the transmission of the distribution data to the user side after the equivalent was actually paid, a method is used wherein, after the confirmation of the transmission to the user, accounting is carried out and the distributed data is then rendered usable on the user side. Thus, the user's benefit can be ensured. In addition, the data in the remaining part, that is, the part other than the partial data, can be sent in an early stage before the payment, and, since the fixed time of the transmission is not limited, the load on the distribution server can be reduced.

In the preferred embodiment of the first to fourth features of the invention, the division of the remaining distribution data into a plurality of parts can realize the regulation of the interval of the distribution of the remaining distribution data for each divided unit to the user according to the progress of the reproduction of the distribution data by the user. This can disperse the transmission of the distribution data, and the load on the distribution server can be reduced. Further, the division of the distribution data into a plurality of parts is advantageous in that, when a user wishes to purchase only a part of the distribution data, the contemplated part of the divided data can be distributed to the user at a reduced charge.

Furthermore, in receiving the distribution of data through a radio network, the realization of the selection of a time zone or the like, where the communication expense is low, rather than the transmission of the whole distribution data at a time, can reduce the communication expense.

Furthermore, according to the second or fourth feature of the invention, even when purchase processing for the distribution data has been repeatedly made in a time zone until the payment is actually made, the payment can be reliably executed.

The invention has been described in detail with particular reference to preferred embodiments, but it will be understood that variations and modifications can be effected within the scope of the invention as set forth in the appended claims.

What is claimed is:

1. A data distribution system, comprising:
   partial data preliminary distribution means for distributing partial data from a source to a user over a communication network, said partial data comprising attribute data and only a part of distribution data, said attribute data including a price of the distribution data, said distribution data having been separated into said part and a remaining part;
   partial data reproduction release means for, when the user indicates to said source a decision to purchase the partial data distributed by the partial data preliminary distribution means or the remaining part of the distribution data, rendering reproducible the partial data, except for the attribute data, from a time of the indication at the earliest; and
   remaining distribution data distribution means for, upon receipt by the source of a request from the user for the distribution of the remaining part of the distribution data corresponding to the partial data, distributing from the source the remaining part of the distribution data to the user over the communication network.

2. The data distribution system according to claim 1, wherein the remaining part of the distribution data is divided into a plurality of parts and which further comprises distribution interval regulation means that regulates an interval of distribution of each part of the plurality of parts of the remaining part of the distribution data from the source to the user according to progress of a reproduction of the distribution data by the user.

3. The data distribution system according to claim 1, wherein the distribution data are distributed from the source to the user through a radio network.

4. A data distribution system, comprising:
   partial data preliminary distribution means for distributing partial data from a source to a user over a communication network, said partial data comprising attribute data and only a part of distribution data, said attribute data including a price of the distribution data, said distribution data having been separated into said part and a remaining part;
   partial data reproduction release means for, when the user indicates to said source a decision to purchase the partial data distributed by the partial data preliminary distribution means or the remaining part of the distribution data, rendering reproducible the partial data, except for the attribute data, from a time of the indication at the earliest;
   payment ability judgment means for said source, upon the receipt of a request from the user for the distribution of a part or the whole of the remaining part of the distribution data corresponding to the partial data, judging whether or not the user can pay the equivalent to the distribution data;

requested data distribution means for, when the judgment by the result of the payment ability judgment means is that the user can pay the equivalent, distributing the requested data from the source to the user over the communication network;

accounting means for the source, when the distribution of the requested data by the requested data distribution means from the source to the user has been confirmed, performing accounting of the distribution data for the user; and requested data reproduction release means for rending the requested data, which has been distributed from the source to the user by the requested data distribution means upon the completion of the accounting by the accounting means, usable on the user side.

5. The data distribution system according to claim 4, which further comprises means, for balance processing during sales processing, that, when the result of the judgment by the payment ability judgment means is that the user can pay the equivalent, issues a sales code indicating, that sales processing is under execution, and subtracts an amount of money to be paid from the user's balance to determine a new balance value.

6. The data distribution system according to claim 5, which further comprises means, for establishing the balance at the time of completion of accounting, that, when accounting has been performed by the accounting mean, discards the sales code to establish the balance.

7. The data distribution system according to claim 5, wherein a period of validity is provided in the sales code and which further comprises means, for establishing the balance at a time of no charging, that, when the period of validity has expired, returns the new-balance value, obtained by subtracting an equivalent value from the balance, to the original value based on recognition that the payment corresponding to an issued sales code has not been made.

8. The data distribution system according to claim 4, wherein the remaining part of the distribution data is divided into a plurality of parts and which further comprises distribution interval regulation means that regulates a interval of distribution of each part of the plurality of parts of the remaining part of the distribution data from the source to the user according to progress of a reproduction of the distribution data by the user.

9. The data distribution system according to claim 4, wherein the distribution data are distributed from the source to the user through a radio network.

10. The data distribution system according to claim 4 which further comprises means, for balance processing during sales processing, that, when the result of the judgment by the payment ability judgment means is that the user can pay the equivalent, issues a sales code indicating, that sales processing is under execution, and subtracts an amount of money to be paid from a user's balance to determine a new balance value.

11. A data distribution system, comprising:
partial data preliminary distribution means for distributing partial data from a source to a storage region provided at a user over a communication network, said partial data including attribute data and only a part of distribution data for which a time of start of use has been fixed, said attribute data able to be disclosed before an arrival of the time of start of use and including at least one of the time of start of use and a price of the distribution data, said distribution data having been separated into said part and a remaining part, said partial data preliminary distribution means configured to distribute said partial data from said source to said storage region provided at said user before the arrival of the time of start of use;

partial data reproduction release means for, when the user indicates to said source a decision to purchase the partial data distributed from said source by the partial data preliminary distribution means or the remaining part of the distribution data, rendering reproducible the partial data, except for the attribute data, from the fixed time of start of use at the earliest; and remaining distribution data distribution means for, after the fixed time of the start of use, upon receipt of a request from the user side for the distribution of the remaining part of the distribution data corresponding to the partial data, distributing the remaining part of the distribution data from said source to the user over the communication network.

12. The data distribution system according to claim 11, wherein the remaining part of the distribution data is divided into a plurality of parts and which further comprises distribution interval regulation means that regulates an interval of distribution of each part of the plurality of parts of the remaining part of the distribution data from the source to the user according to progress of a reproduction of the distribution data by the user.

13. The data distribution system according to claim 11, wherein the distribution data are distributed from the source to the user through a radio network.

14. A data distribution system, comprising:
partial data preliminary distribution means for distributing partial data from a source to a user over a communication network, said partial data comprising attribute data and only a part of distribution data for which a time of start of use has been fixed, said attribute data able to be disclosed before an arrival of the time of start of use and including at least one of the time of start of use and a price of the distribution data, said distribution data having been separated into said part and a remaining part, said partial data preliminary distribution means configured to distribute said partial data from said source to said user before the arrival of the time of start of use;

partial data reproduction release means which, when the user indicates to said source a decision to purchase the partial data distributed by the partial data preliminary distribution means or the remaining part of the distribution data, renders the partial data except for the attribute data reproducible from the time of start of use at the earliest;

payment ability judgment means which, after the fixed time of start of use, upon the receipt of a request by the source from the user for the distribution of a part or the whole of the remaining part of the distribution data corresponding to the partial data, judges whether or not the user can pay the equivalent to the distribution data;

requested data distribution means which, when the judgment by the payment ability judgment means is that the user can pay the equivalent, distributes the requested data from said source to the user over the communication network;

accounting means which, when the distribution of the requested data from the source to the user by the requested data distribution means has been confirmed, performs accounting of the distribution data for the user; and requested data reproduction release means which renders the requested data, which has been distributed from said source to said user by the requested data distribution means upon the completion of the accounting by the accounting means, usable on the user side.

15. The data distribution system according to claim 14, wherein the remaining part of the distribution data is divided into a plurality of parts and which further comprises distribution interval regulation means that regulates an interval of distribution of each part of the plurality of parts of the remaining part of the distribution data from the source to the user according to progress of a reproduction of the distribution data by the user.

16. The data distribution system according to claim 14, wherein the distribution data are distributed from the source to the user through a radio network.

17. The data distribution system according to claim 14, which further comprises means, for balance processing during sales processing, that, when the result of the judgment by the payment ability judgment means is that the user can pay the equivalent, issues a sales code indicating, that sales processing is under execution, and subtracts an amount of money to be paid from a user's balance to determine a new balance value.

18. The data distribution system according to claim 17, which further comprises means, for establishing a balance at the time of the completion of accounting, that, when accounting has been performed by the accounting mean, discards the sales code to establish the balance.

* * * * *